(12) United States Patent
Singhal et al.

(10) Patent No.: US 10,819,526 B2
(45) Date of Patent: Oct. 27, 2020

(54) IDENTITY-BASED CERTIFICATE AUTHORITY SYSTEM ARCHITECTURE

(71) Applicant: Microsoft Technology Licensing, LLC, Redmond, WA (US)

(72) Inventors: Hirsch Patrick Singhal, Seattle, WA (US); Duncan Allan Horn, Bellevue, WA (US); Michael A. Bishop, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 297 days.

(21) Appl. No.: 15/899,354

(22) Filed: Feb. 19, 2018

(65) Prior Publication Data
US 2019/0260594 A1    Aug. 22, 2019

(51) Int. Cl.
*H04L 29/06* (2006.01)
*H04L 9/32* (2006.01)
(Continued)

(52) U.S. Cl.
CPC .......... *H04L 9/3263* (2013.01); *H04L 9/006* (2013.01); *H04L 9/3073* (2013.01);
(Continued)

(58) Field of Classification Search
CPC ..... H04L 9/3263; H04L 9/006; H04L 9/3073; H04L 9/3247; H04L 63/06; H04L 63/062; H04L 63/08023
See application file for complete search history.

(56) References Cited

U.S. PATENT DOCUMENTS

| 6,085,320 A | * | 7/2000 | Kaliski, Jr. | ............. G06F 21/33 |
| | | | | 713/168 |
| 6,233,341 B1 | | 5/2001 | Riggins | |

(Continued)

FOREIGN PATENT DOCUMENTS

| EP | 1662698 A1 | 5/2006 |
| EP | 2731310 A1 | 5/2014 |

OTHER PUBLICATIONS

"International Search Report and Written Opinion Issued in PCT Application No. PCT/US19/017562", dated Apr. 23, 2019, 11 Pages.

(Continued)

*Primary Examiner* — Sarah Su
(74) *Attorney, Agent, or Firm* — Workman Nydegger

(57) ABSTRACT

A system includes a processor and a computer-readable medium storing instructions for execution. The instructions include generating a cryptographic pair of user public and private keys for a user. The instructions include registering an identity of the user with an identity provider, transmitting the user public key, and receiving a user certificate from the identity provider. The instructions include signing a trust certificate for a web server, including an address and a public key of the web server, with the user private key. The instructions include, in response to an access request from the user specifying a second web server: obtaining a second trust certificate from the second web server; and establishing a connection with the second web server in response to successful verification of a signature of the second trust certificate using a public key corresponding to a trusted contact of the user.

16 Claims, 15 Drawing Sheets

(51) Int. Cl.
   *H04L 9/00* (2006.01)
   *H04L 9/30* (2006.01)
(52) U.S. Cl.
   CPC ............ *H04L 9/3247* (2013.01); *H04L 63/06* (2013.01); *H04L 63/062* (2013.01); *H04L 63/0823* (2013.01)

(56) References Cited

U.S. PATENT DOCUMENTS

| | | | |
|---|---|---|---|
| 9,203,826 B1 | 12/2015 | Margolis et al. | |
| 9,258,303 B1* | 2/2016 | Galwas | H04L 63/061 |
| 9,716,708 B2* | 7/2017 | Love | G06F 21/6218 |
| 10,218,515 B2* | 2/2019 | Janjua | H04L 9/0643 |
| 2005/0204163 A1* | 9/2005 | Alkove | H04N 21/4367 |
| | | | 726/5 |
| 2010/0275014 A1* | 10/2010 | Kelley | G06F 21/51 |
| | | | 713/157 |
| 2012/0033807 A1* | 2/2012 | Asim | H04L 9/0866 |
| | | | 380/44 |
| 2014/0304505 A1* | 10/2014 | Dawson | H04L 63/0428 |
| | | | 713/165 |
| 2015/0350198 A1* | 12/2015 | Li | H04L 9/3265 |
| | | | 713/156 |
| 2016/0275281 A1 | 9/2016 | Ranjit et al. | |
| 2016/0352521 A1* | 12/2016 | Choi | H04L 9/007 |
| 2017/0272245 A1* | 9/2017 | Norton | H04L 9/3247 |
| 2018/0253539 A1* | 9/2018 | Minter | H04L 63/0861 |
| 2019/0289464 A1* | 9/2019 | Loreskar | H04L 63/0892 |
| 2020/0145409 A1* | 5/2020 | Pochuev | H04W 4/70 |

OTHER PUBLICATIONS

Gong, Neil Zhenqiang et al.; On the Security of Trustee-Based Social Authentications; IEEE Tranactions on Information Foresics and Security; vol. 9, No. 8; Aug. 2014; 13 pages.

How can I use my friends (ex: trusted contacts) to get back into my account?; Faceboook Help Centre; Desktop Help; Oct. 12, 2016; 2 pages.

Introducing Trusted Contacts; Facebook Security; May 2, 2013; 2 pages.

* cited by examiner

IDENTITY-BASED CERTIFICATE AUTHORITY SYSTEM ARCHITECTURE

FIELD

The present disclosure relates to systems and methods for authentication and authorization, and more particularly to certificate-based public key infrastructure.

BACKGROUND

Currently, trust in the World Wide Web is built around a certificate authority (CA) system. A set of companies operating as root CAs are trusted by most web users. Because the web is accessed primarily through a browser, this means that most browsers are preconfigured to trust this set of root CA companies by the browsers' developers. These root CA companies can then sign certificates that attest to the validity of individual websites. Additionally or alternatively, these root CA companies can delegate certificate signing authority to a company acting as an Intermediate CA. When the user's browser is preconfigured to trust a root CA and the root CA attests to the validity of the Intermediate Certificate Authority, the user's browser will then trust websites attested to by the Intermediate Certificate Authority.

According to the Hypertext Transfer Protocol Secure (HTTPS) framework, attestation by a root CA or an intermediate CA gives some assurance to the user that the web server is actually associated with the genuine website they want to communicate with. When an agent (such as a web browser) first communicates with a device or server over a network (such as an intranet or the internet), the agent establishes that communication is occurring with the legitimate web server. For example, the agent establishes that the server responding to www.bing.com is the real www.bing-.com operated by Microsoft Corporation. The agent may also establish that the agent has a right to talk to this server or device, a process called authentication and authorization. Authorization may not be required for publicly available services, such conducting a search using the Bing search system from Microsoft Corporation.

Encryption, such as Secure Sockets Layer (SSL) or Transport Layer Security (TLS), provides some mathematical assurance that the connection between the agent and the server cannot be compromised or the plaintext contents of the communication eavesdropped on. However, assurance that the agent is communicating with a legitimate server relies on trust—that is, trust in an attestation by a root CA (or an intermediate CA to which the root CA has delegated trust).

The current CA system is expensive, opaque to most users, frequently compromised, and unworkable in dynamic environments. To allow a user to access any website worldwide, browsers are preconfigured with a large array of trusted root CAs. Even most technical users are not familiar with many of these root CAs and the average user may not have heard of any of the root CAs. If any one of the root CAs (or trusted intermediate CAs) is compromised, the guarantee of web server legitimacy by the CA system is broken.

For example, consider a small root CA that is compromised by a nation-state actor. The nation-state actor may generate a fraudulent certificate attesting that a server operated by that nation-state actor corresponds to a popular website. When users in that nation-state attempt to communicate with the popular website, the nation-state may intercept that traffic and direct it to the server under their control. The browser, however, will still trust this illegitimate server because it presents a certificate signed by one of the CAs that the browser trusts.

A further problem with the current CA system is that certificates are generally created to include considerable amounts of data assumed to be permanent, such as the name of the webpage or, in some instances, an Internet Protocol (IP) address. However, in dynamic environments, such as Internet of Things (IoT) systems, this data may not be permanent and a brittle certificate system may be unworkable. The difficulties of the current CA approach in a dynamic environment are exacerbated when a certificate needs to be revoked, such as if it was improperly issued to the wrong party.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a computer-readable medium configured to store instructions for execution by the at least one processor. The instructions include generating a user public key and a user private key. The user public key and the user private key together form a cryptographic key pair for a first user. The instructions include registering an identity of the first user with a first identity provider. Registering the identity includes transmitting the user public key to the first identity provider. The instructions include, in response to transmitting the user public key to the first identity provider, receiving a user certificate from the first identity provider. The user certificate is signed by the first identity provider and includes the user public key and identity information corresponding to the identity of the first user. The instructions include identifying a set of trusted contacts. The set of trusted contacts includes other users of the first identity provider. The instructions include generating a trust certificate for a web server and signing the trust certificate using the user private key. The trust certificate includes an address of the web server and a public key of the web server. The instructions include, in response to an access request from the first user specifying a second web server: contacting the second web server and receiving a second trust certificate from the second web server; in response to successful verification of the signature of the second trust certificate with a public key corresponding to one of the set of trusted contacts, establishing a connection with the second web server.

In other features, the trust certificate for the web server includes the user public key; and the instructions include transmitting the trust certificate to the web server. In other features, the instructions further include signing the user certificate using the user private key; and the identity information includes at least one of (i) a username of the first user at the first identity provider, (ii) an email address of the first user, (iii) a real name of the first user, and (iv) a social media handle of the first user. In other features, the instructions include sending commands to the first identity provider to establish a first subset of the set of trusted contacts; and receiving a public key for each of the first subset of the set of trusted contacts from the first identity provider. The received public keys are stored for use in verifying trust certificate signatures.

In other features, the instructions include, in response to the second trust certificate specifying a public key: attempting to verify the signature with the specified public key; and in response to successful verification of the signature with the specified public key, establishing the connection with the second web server in response to the specified public key matching the public key corresponding to the one of the set of trusted contacts. In other features, a public key of the first identity provider is pre-programmed into the system before communication is established with the first identity provider; and the instructions further include establishing authenticity of the first identity provider based on the public key of the first identity provider. In other features, the set of trusted contacts includes at least one of people who are registered with the first identity provider and are known by the first user; and businesses that are registered with the first identity provider and have a relationship with the first user.

In other features, the user certificate was signed by a private key of the first identity provider. The private key of the first identity provider corresponds to a public key of the first identity provider; and the instructions further include verifying the user certificate using the public key of the first identity provider. In other features, the instructions further include obtaining a second user certificate from a second identity provider; creating a cumulative certificate including the user certificate and the second user certificate; and signing the cumulative certificate using the user private key. The set of trusted contacts selectively includes users of the second identity provider.

In other features, the trust certificate includes the user certificate. In other features, the set of trusted contacts selectively includes users of a second identity provider. In other features, the instructions include sending commands to the first identity provider to establish a first subset of the set of trusted contacts. In other features, the instructions include receiving a public key for each of the first subset of the set of trusted contacts from the first identity provider. In other features, the instructions include obtaining a public key for each of the set of trusted contacts.

In other features, the second trust certificate specifies a public key. The instructions further include attempting to verify the signature with the specified public key and, in response to successful verification of the signature with the specified public key, establishing the connection with the second web server in response to the specified public key matching the public key corresponding to the one of the set of trusted contacts. In other features, a public key of the first identity provider is pre-programmed into the system before communication is established with the first identity provider. The instructions further include establishing authenticity of the first identity provider based on the public key of the first identity provider.

In other features, a public key of a first certificate authority is pre-programmed into the system before communication is established with the first identity provider. The instructions further include establishing authenticity of the first identity provider by receiving a certificate presented by the first identity provider and validating the certificate using the public key of the first certificate authority. In other features, the set of trusted contacts includes people who are registered with the first identity provider and are known by the first user. In other features, the set of trusted contacts includes businesses that are registered with the first identity provider and have a relationship with the user.

A system includes at least one processor and a computer-readable medium configured to store instructions for execution by the at least one processor. The instructions include, in response to receiving a provisioning command, storing the user public key and sending a system public key corresponding to the system to a user agent corresponding to a first user. The provisioning command includes a user public key corresponding to the first user. The system public key and a system private key together form a cryptographic key pair for the system. The instructions include maintaining access rules for a first connected device. The instructions include, in response to receiving a first certificate, using the stored user public key, attempting to verify a signature of the first certificate using the stored user public key; and in response to successful verification of the signature of the first certificate, revising the access rules based on information in the first certificate. The instructions include, in response to receiving an access request for access to the first connected device from a first requestor, (i) determining whether the access request satisfies the access rules and (ii) in response to determining that the access request satisfies the access rules, generating a token, signing the token using the system private key, and transmitting the signed token to the first requestor. The token includes a public key of the first requestor and a public key of the first connected device.

In other features, the access request includes the public key of the first requestor and the public key of the first connected device; and the access rules include a set of device public keys; and for each device public key of the set of device public keys, a set of authorized public keys. In other features, determining whether the access request satisfies the access rules includes (i) identifying whether the public key of the first connected device is present in the set of device public keys and (ii) in response to identifying that the public key of the first connected device is present in the set of device public keys, selecting the set of authorized public keys corresponding to the public key of the first connected device and determining whether the public key of the first requestor is present in the selected set of authorized public keys. In other features, the instructions further include attempting to verify a signature of the access request using the public key of the first requestor; and the determining whether the access request satisfies the access rules is performed only in response to successful verification of the signature of the access request.

In other features, the instructions further include verifying whether the access request was signed by the first requestor. The determining whether the access request satisfies the access rules is performed only in response to verification that the access request was signed by the first requestor. In other features, the public key of the first requestor and a private key of the first requestor together form a cryptographic key pair for the first requestor. Verifying whether the access request was signed by the first requestor includes verifying whether the access request was signed using the private key of the first requestor.

In other features, verifying whether the first certificate was signed by the user private key is performed using the stored user public key. In other features, the instructions further include generating the system public key and the system private key. In other features, the token indicates an expiration time that is less than one year subsequent to generation of the token.

An identity provider system includes at least one processor and a computer-readable medium configured to store instructions for execution by the at least one processor. The instructions include storing information regarding an identity of a first user. The information includes a unique identifier of the first user. The instructions include receiving a user public key from the first user. The user public key and a user private key together form a cryptographic key pair for the first user. The instructions include associating the unique identifier with the user public key. The instructions include generating a certificate including the user public key and the unique identifier. The instructions include signing the certificate using a private key. The instructions include transmitting the signed certificate to the first user. The instructions include, in response to commands from the first user, maintaining a set of trusted contacts for the user. The set of trusted contacts includes other users of the identity provider system. The instructions include, in response to receiving, from the first user, a first trust certificate corresponding to a first web server: (i) selectively storing the first trust certificate in association with the unique identifier of the first user; and (ii) in response to receiving, from one of the set of trusted contacts, a trust certificate request targeting the first web server, selectively transmitting the trust certificate to the one of the set of trusted contacts.

In other features, the instructions include transmitting, to the first user, a public key for each of the set of trusted contacts. In other features, the unique identifier includes at least one of (i) a username of the first user for use in the identity provider system, (ii) an email address of the first user, (iii) a real name of the first user, and (iv) a social media handle of the first user. In other features, the set of trusted contacts is a subset of contacts with whom the first user is associated in the identity provider system; and the contacts with whom the first user is associated in the identity provider system include at least one of (i) one or more humans and (ii) one or more businesses. In other features, the instructions include, in response to receiving, from the first user, a trust certificate request targeting a second web server: (i) identifying a set of trust certificates; (ii) in response to the set of trust certificates being non-empty, selectively transmitting at least one of the set of trust certificates to the first user; and (iii) in response to the set of trust certificates being empty, transmitting an error to the first user. Each of the trust certificates in the set of trust certificates corresponds to the second web server and is associated with the set of trusted contacts. The error indicates a lack of trust in the second web server.

In other features, the instructions include, in response to receiving, from the one of the set of trusted contacts, the trust certificate request targeting the first web server: (i) attempting to verify a signature of the trust certificate request; and (ii) transmitting the first trust certificate to the one of the set of trusted contacts only in response to successful verification of the signature. In other features, the instructions include, in response to receiving, from the first user, the first trust certificate: (i) attempting to verify a signature of the first trust certificate using the user public key; and (ii) storing the first trust certificate in association with the unique identifier of the first user only in response to successful verification of the signature.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
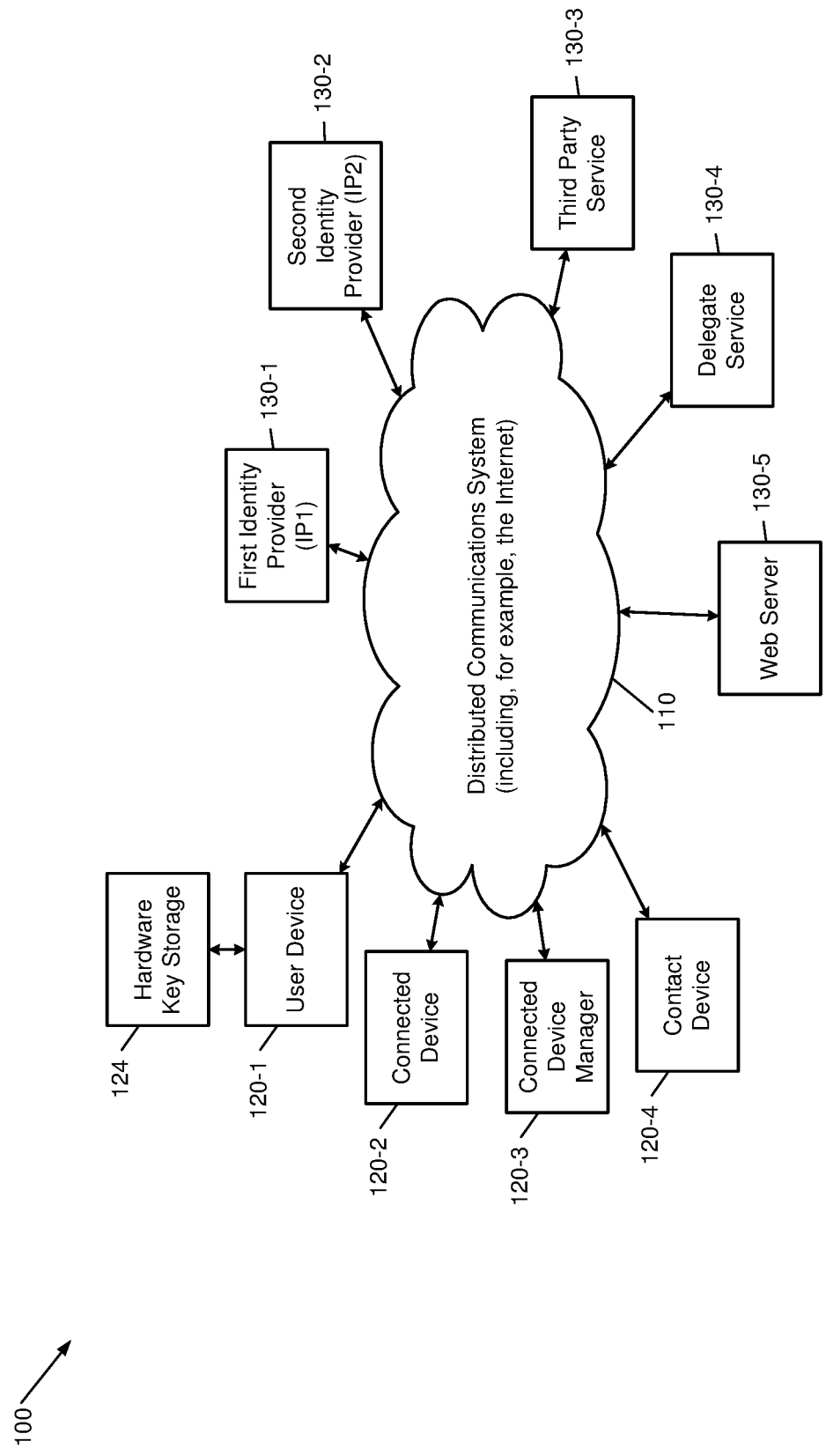
FIG. 1 is a graphical representation of a system including hardware elements implemented according to the principles of the present disclosure.

To solve many of the problems associated with the existing certificate authority (CA) system, the present disclosure describes individual entities such as web server operators and end users acting as intermediate CAs. In the disclosed system identify providers act as root CAs, which vouch for the authenticity of the intermediate CAs. For example, the identity providers may include Microsoft Corp., Google LLC, Facebook Inc., Sina Weibo, Tencent, Twitter Inc., and enterprise directories such as Azure Active Directory from Microsoft Corp.

The disclosure will be described primarily through the lens of an end user being the intermediate CA. The end user creates a certificate that is signed by an identity provider. This certificate establishes that the identity provider attests to the ownership of the identity by the user holding the certificate. Then, other users of that same identity provider can be assured that the holder of the certificate corresponds to the identity attested to by the identity provider.

For example, when an identity provider is an email service, the certificate establishes that the user controlling the certificate is associated with that email address as far as the email provider is concerned. As another example, a user of the WeChat service from Tencent may be identified by a username. A certificate according to the principles of the present disclosure represents Tencent's assertion that the holder of the certificate corresponds to the name of the WeChat account. Other users of the WeChat service can then be assured that the person controlling a WeChat-signed certificate corresponds to a particular contact in their WeChat contacts.

A user may hold multiple certificates from multiple identity providers. In this way, the user can establish their identity to users of various identity providers. The user may present the certificate corresponding to a first identity provider to another user of the first identity provider while presenting the certificate corresponding to a second identity provider to a user of the second identity provider. In some implementations, the user may combine certificates from multiple identity providers into a single cumulative certificate for presentation and the cumulative certificate will then be recognized by a user of any of those identity providers.

With a certificate created according to the principles of the present disclosure, the user can delegate authority possessed by that user. As examples, the delegated authority might be the ability to post a message to a social media service, to access documents in a hosted document management platform, to control an actuator such as a smart door lock, etc. The user can even use the certificate to delegate authority to yet another intermediate CA. For example, the user may authorize a connected device manager, such as an IoT hub, to grant access to third parties to a connected device, such as a smart door lock.

The user may also use the certificate to vouch for the authenticity of a service such as website. In some situations, the user may operate or control their own service or web site and use the certificate to vouch for the authenticity of that service or website. As another example, the user could employ their certificate to grant access to a network, such as a residential wireless network, for specific contacts (such as friends or family). As another example, if a payment provider, such as a credit card processing service, associated a credit card with a specific identity, the user holding the certificate for that identity can use the certificate to instruct payment from that credit card.

To create a certificate, the user instructs a computerized agent to generate a public-private key pair. The private key is maintained by the user securely and not shared with any other parties. The public key is provided to an identity provider, who signs a certificate that includes the public key and the identity that the identity provider associates with the presenter of the public key. For example, this identity may be a hexadecimal number that uniquely identifies the identity within the identity provider's system. Additionally or alternatively, the identity may carry more semantic meaning, such as the user's name, email address, or social media handle.

The signed certificate represents an attestation by the identity provider that the holder of the private key corresponding to the public key in the certificate corresponds to the identity within the certificate. The user then countersigns the certificate to indicate that the user approves of creation of that certificate by the identity provider. This may prevent the identity provider from incorrectly (whether intentionally or not) conveying that a certain user is associated with that identity provider.

Digressing momentarily, an entity in a Public Key Infrastructure (PKI) system has a pair of keys: a private key and a corresponding public key. The public key is distributed publicly and the private key is held in secret by the entity. The entity can generate a signature for data, such as a certificate, by computing a cryptographic function on the certificate using the private key. Then, anyone can verify that the signature was created by an entity holding the private key by computing another cryptographic function on the certificate using the public key.

The signature may be generated by first hashing the certificate to generate a fixed-length value. For example, Secure Hash Algorithm 3 (SHA-3) with an output size of 512 bits may be used. The resulting hash is then signed using an encryption algorithm, which takes as inputs the hash as well as the private key of the signer. As an example only, the signature algorithm may be the RSA probabilistic signature scheme (RSA-PSS) signature algorithm. In some implementations, the user combines certificates from multiple identity providers into a cumulative certificate and then signs the cumulative certificate with the user's private key.

The architecture of the present disclosure may supplement or even replace the existing root CA system. The public keys of a newly defined intermediate CA, representing a user's relative trust or access in a system, can be circulated among a web of trust. The web of trust includes trusted contacts—people with whom the user has a relationship—for example, this may include coworkers, family, friends, roommates, management structures, chains of command, etc. The user's public key for a particular identity provider may be circulated among the user's contacts list maintained by the identity provider.

A user is able to use their status as an intermediate CA to create an endpoint certificate for a device or service. Another user, when attempting to use that service, would be able to do one of two things. First, the other user may chain the certificate up through a chain of trust to an identity provider, which would then provide information about the user. Second, the other user may verify the end certificate against their own list of trusted contacts. In the former case, the user would have to determine if they trusted the person enough to accept the connection by reviewing the identity, such as by getting the link to the user's profile page. In the second scenario, trust may automatically be established by the user being in the contacts list or friend group.

Currently, most IoT devices serve their web content over unsecured Hypertext Transfer Protocol (HTTP) because they do not have trusted certificates. However, according to the present disclosure, users can sign certificates for the IoT devices. For example, a first user may install a smart lock in their residence. The first user provisions the lock (directly or through a hub to which the first user delegated provisioning rights). The smart lock may be provisioned with a certificate signed by the first user's private key, which allows the smart lock to assert that it is a device authorized by the first user. More importantly, the certificate includes the public key of the first user so that the smart lock will know whether to trust update requests, such as to an access control list.

The first user can provision the smart lock with the public keys of people who can access the smart lock, such as roommates. When a roommate arrives at the residence, she may have a hardware key (or an app on her smartphone) containing a certificate that represents her. In various implementations, the certificate is updated frequently, such as on a daily basis. This limits the attack window if a certificate is lost or stolen. The certificate will have to be renewed on a daily basis and, if the certificate is lost or stolen, this renewal can be stopped.

The smart lock is able to verify that the authorized user's certificate chains up to the public key of the roommate, which the first user has provisioned in the smart lock. Upon verification, the roommate can unlock the smart lock. At any time, the first user can adjust the list of public keys in the smart lock (either directly or through a smart device hub).

In fact, the first user may update the smart lock with a list of public keys for a temporary period, such as the duration of a party. If the party has been organized through a specific identity provider, the public keys may be obtained from that identity provider. For example, if a party invite has been sent to recipients using the Facebook social media network, the invitees (or those invitees who responded to the invite affirmatively) may be included in the list of public keys. The first user can then provision the smart lock with these public keys and either remove the list of public keys after the party or instruct the smart lock to discard the list of public keys after a certain period of time.

Similar to smart locks, the door scanners at an office building may be provisioned by the building owner. The authority to create new certificates with limited validity periods is delegated to the building receptionist. The receptionist can then create and sign certificates that allows building access to visitors and those people who forgot their badges.

Another use case is to provision a wireless router. The first user provisions the router with a list of people permitted to connect to the router. In various implementations, the access list has multiple sections, specifying whether the person is connected to a guest network or to the internal network.

The first user creates a certificate for the router indicating that the router is associated with the first user. When an authorized person wants to connect to the router, the router can present the certificate so that the authorized person knows the router is associated with the first user (and is not a rogue access point). Assuming that the authorized person trusts the first user (such as by listing the first user in their contacts or in a select group of trusted contacts), the authorized person can trust that the wireless router is associated with the first user and not with a malicious actor. In addition, the first user can provision the wireless router with the public keys of roommates or guests so that the wireless router can grant access to users who present certificates with one of those public keys.

A salient advantage of the present disclosure over prior architectures, which may leverage JavaScript Object Notation (JSON) Web Token (JWT) or OAuth standards, is that each individual user is given agency. While an identity provider may still sign a certificate on behalf of the user, the user controls the private key behind the public key contained in the certificate and is then able to control what actions are taken with the private key. In some implementations, the user is further able to countersign the identity provider's certificate, indicating that the identity provider created the certificate at the direction of the user. Still further, the user may combine certificates from multiple identity providers.

By decentralizing control of private keys, the ability of an identity provider to take unauthorized action (whether inadvertently or maliciously) on behalf of a user is diminished. For example, if a social media identity provider decides to give (or is tricked into giving) a rogue app's permission to post on a user's wall or feed, there is very little available as a technical countermeasure. According to the present disclosure, the social media identity provider can demand the user's certificate for such posts, providing a technological measure preventing the social media identity provider from improperly delegating that permission.

Environment

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

FIG. 1 shows, as an example only, a simplified distributed computing system 100 including a distributed communications system 110. The distributed communications system 110 may include a wired or wireless local area network (LAN), a wide area network (WAN) such as the Internet, and other types of network. The distributed communications system 110 may allow computing systems at different locations to communicate with each other.

A user device 120-1 is controlled by a first user. For simplicity, throughout the disclosure, this first user will be referred to as the user and the cryptographic keys of the first user will be referred to as the user's keys. The user may own or control multiple user devices beyond just the user device 120-1 depicted in FIG. 1. The user devices may include smartphones, personal digital assistants (PDAs), tablets, laptop computers, personal computers (PCs), wearable devices, etc.

A user agent performs actions on behalf of the user according to the principles of the present disclosure. The user agent is implemented by software that executes on one or more devices, such as the user device 120-1. As described in more detail below, the user agent may store the private key of the user in the user device 120-1, such as in a secure hardware storage location. In other implementations, the user device 120-1 may access an external hardware key storage 124, such as a universal serial bus (USB) device where the private key is stored.

For increased security, the hardware key storage 124 may perform signing at the request of the user device 120-1 without ever providing the private key to the user device 120-1. In other implementations, the hardware key storage 124 may generate a delegated certificate based on the private key for the user device 120-1. The user device 120-1 can then sign on behalf of the user using the delegated certificate without ever accessing the original private key, which remains in the hardware key storage 124. Then, the hardware key storage 124 needs to be connected to the user device 120-1 only when a new certificate is needed. For example, this may occur when the user device 120-1 is factory reset or when the delegated certificate expires.

A connected device 120-2 may be installed at the residence or workplace of the user. Connected devices are sometimes referred to as IoT devices. The connected device 120-2, as an example only, may be a connected thermostat, a smart door lock, a smart light, etc. A connected device manager 120-3, such as a smart hub, may control the connected device 120-2 and other connected devices at the same location.

A contact of the user owns or controls a client device, which is referred to as contact device 120-4. For example, the contact device 120-4 may be a personal computer, wearable device, or portable device (such as a smartphone or tablet) associated with the user's contact.

A first identity provider (IP1) 130-1 maintains a set of identities. For example, these identities may be associated with names, social media posts, photos, etc. A second identity provider (IP2) 130-2 maintains another set of identities, such as a set of email addresses. In other examples, the set of identities may be a set of microblogging handles. The owners of the user device 120-1 and the contact device 120-4 may have mutually associated with each other through an identity provider, such as the first identity provider 130-1 or the second identity provider 130-2.

The first identity provider 130-1 and the second identity provider 130-2 may provide additional services beyond simply maintaining identities. For example, messaging, chat, web hosting, photo sharing, and other services may be provided. Although only two identity providers are pictured in FIG. 1 and the following figures, additional identity providers can be implemented according to the principles of the present disclosure.

Further, the present disclosure will operate even if there is only a single identity provider. In a region where there is an authoritative identity provider, that identity provider may be used to the exclusion of other identity providers. For example, a European country may maintain a national ID system, which may operate as the identity provider for all users within that country.

A third party service 130-3 provides services to users. There are almost an infinite number of services that can be provided, but as one example, the service may be a software code repository or software version control system. Users may log into the third party service 130-3 using credentials specific to the third party service 130-3. Additionally or alternatively, the third party service 130-3 may allow users to log in based on their identity having been established by the first identity provider 130-1 or the second identity provider 130-2.

A third party service to which the user has delegated authority may be referred to as delegate service 130-4. A web server 130-5 serves webpages and may be under the control of the user or of a third party. The web server 130-5 may be a physical device or a virtual machine, or may be operating in a containerized infrastructure.

Figure 2:
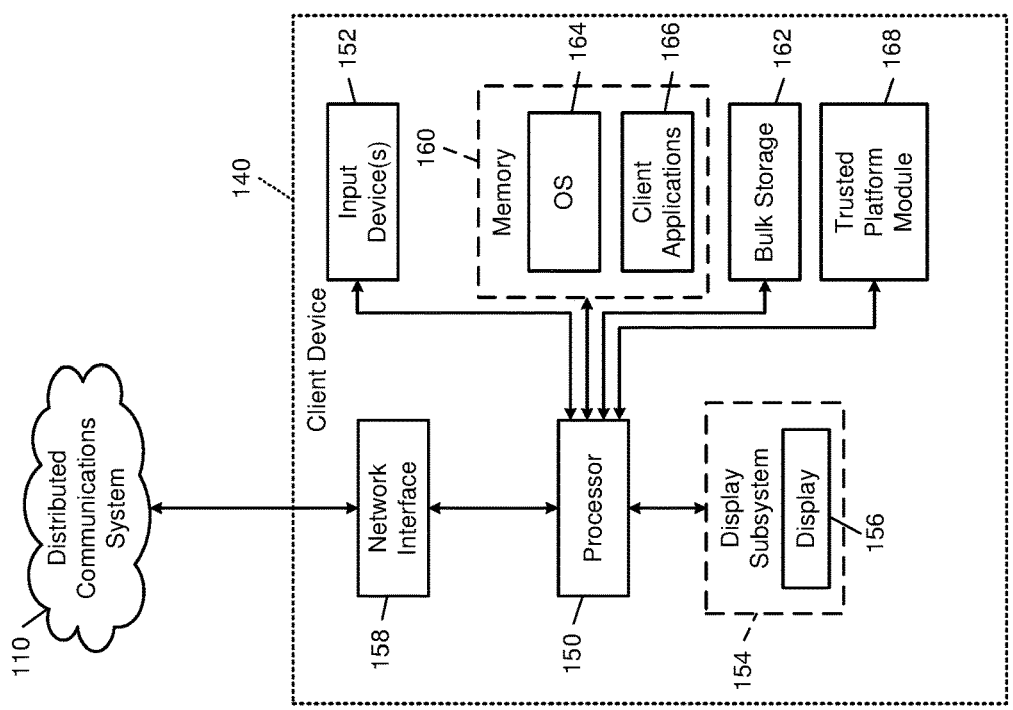
FIG. 2 is a functional block diagram of an example implementation of a client device.

The user device 120-1, the connected device 120-2, the connected device manager 120-3, and the contact device 120-4 may each be implemented by hardware such as client device 140. FIG. 2 shows a simplified example of the client device 140. The client device 140 may typically include a central processing unit (CPU) or processor 150, one or more input devices 152 (e.g., a keypad, touchpad, mouse, touchscreen, etc.), a display subsystem 154 including a display 156, a network interface 158, memory 160, bulk storage 162, and a trusted platform module 168.

The network interface 158 connects the client device 140 to the distributed computing system 100 via the distributed communications system 110. For example, the network interface 158 may include a wired interface (for example, an Ethernet interface) and/or a wireless interface (for example, a Wi-Fi, Bluetooth, near field communication (NFC), or other wireless interface). The memory 160 may include volatile or nonvolatile memory, cache, or other type of memory. The bulk storage 162 may include flash memory, a magnetic hard disk drive (HDD), and other bulk storage devices. The processor 150 of the client device 140 executes an operating system (OS) 164 and one or more client applications 166.

Figure 3:
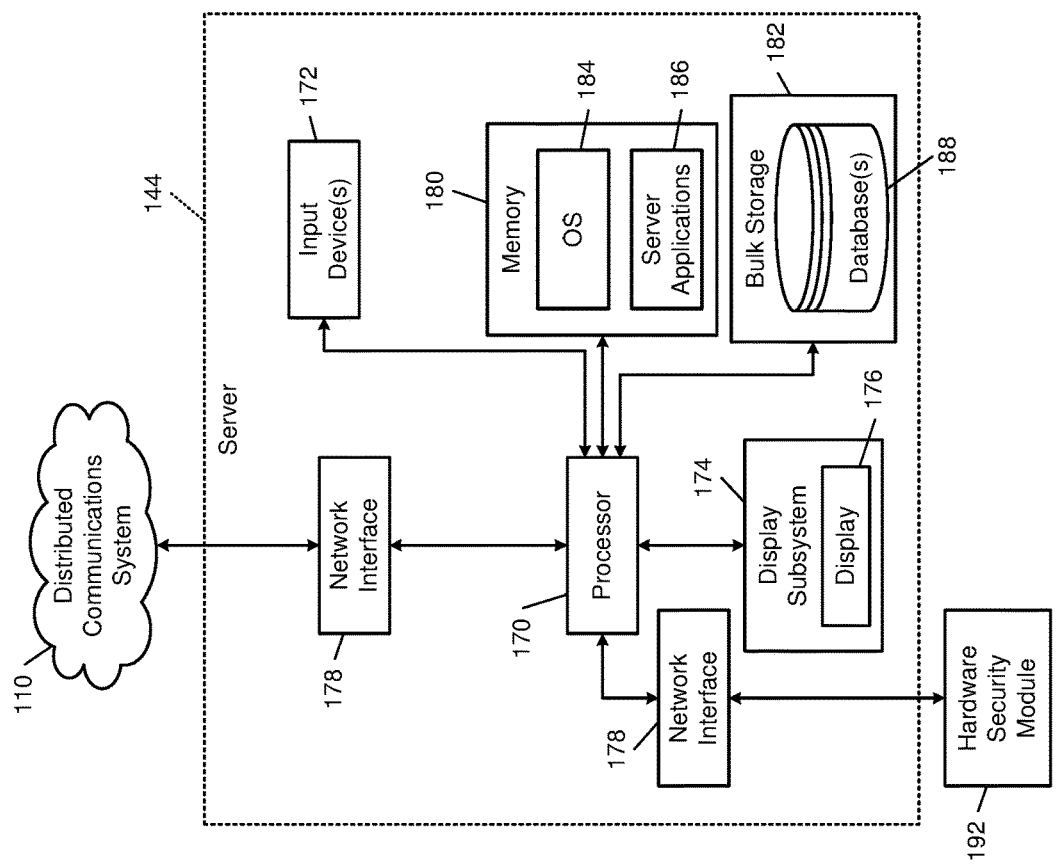
FIG. 3 is a functional block diagram of an example implementation of a server.

The first identity provider 130-1, the second identity provider 130-2, the third party service 130-3, the delegate service 130-4, and the web server 130-5 may each be implemented by hardware such as server 144. FIG. 3 shows a simplified example of the server 144. The server 144 typically includes one or more CPUs or processors 170, a network interface 178, memory 180, and bulk storage 182. In some implementations, the server 144 may be a general-purpose server and include one or more input devices 172 (e.g., a keypad, touchpad, mouse, and so on) and a display subsystem 174 including a display 176.

The network interface 178 connects the server 144 to the distributed communications system 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more magnetic hard disk drives (HDDs), or other bulk storage devices.

The processor 170 of the server 144 executes an operating system (OS) 184 and one or more server applications 186, which may be housed in a virtual machine hypervisor or containerized architecture. The bulk storage 182 may store one or more databases 188 that store data structures used by the server applications 186 to perform respective functions.

A second network interface 190 may allow the processor 170 to communicate with a hardware security module (HSM) 192 without directly exposing the HSM 192 to any other network devices associated with the distributed communications system 110. The HSM 192 may securely store private keys for use by the server 144 and in some implementations will provide signatures to the server 144 without disclosing the private key. The HSM 192 may be designed such that, once a private key is stored in the HSM 192, the private key can never again be read. The HSM 192 may also be designed such that attempts to access the private key, either through software attacks or physical tampering, cause the private keys to be erased.

Identity Providers

Figure 4A:
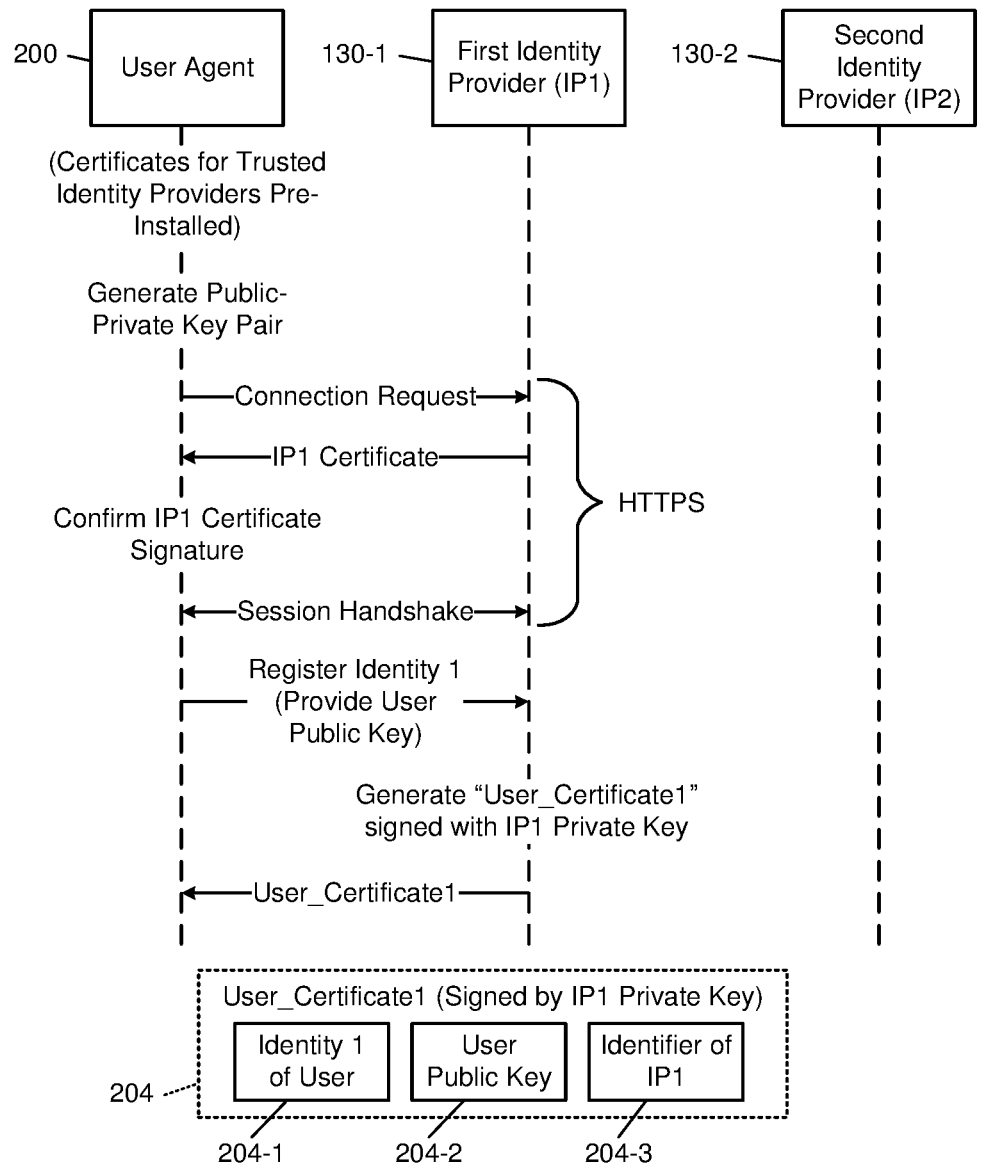
FIG. 4A is a message sequence chart demonstrating a user agent obtaining a certificate from an identity provider.

In FIG. 4A, a user agent 200 of the user is shown obtaining a certificate from the first identity provider 130-1. The user agent 200 may operate on the user device 120-1 at the instruction of the user. For example only, the user agent 200 may be implemented in an authentication application executing on the user device 120-1.

In the implementation shown, certificates for trusted identity providers are preinstalled in the user agent 200. The certificates include, for this example, certificates for the first identity provider 130-1 and the second identity provider 130-2. The user agent 200 sends a connection request to the first identity provider 130-1. The first identity provider 130-1 provides a certificate to the user agent 200. The provided certificate may match exactly the preinstalled certificate or the certificate may simply be signed by the same private key corresponding to the public key in the preinstalled certificate.

In other implementations, for security purposes, the first identity provider 130-1 may maintain an intermediate certificate and corresponding private key that have been signed by the private key corresponding to the public key and the preinstalled certificate. The first identity provider 130-1 then uses this intermediate certificate to sign certificates for normal use. The first identity provider 130-1 may provide this intermediate certificate along with the preinstalled certificate so that the user agent 200 can be sure that the intermediate certificate was properly signed and that the preinstalled certificate was then properly signed by the private key corresponding to the intermediate certificate.

The user agent 200 and the first identity provider 130-1 may then engage in a handshake to allow encrypted communication. The certificate provision and handshake may be conducted in accordance with Hypertext Transfer Protocol Secure (HTTPS). The user agent 200 registers a specific identity corresponding to the user with the first identity provider 130-1. For example, this identity may include a name and a picture. The first identity provider 130-1 may internally assign a unique identifier to this identity and associate all information about the user with this unique identifier.

To create an identity and corresponding certificates for the user, the user agent 200 generates a public key and a private key according to a public key infrastructure standard. For example only, the Elliptic Curve Digital Signature Algorithm (ECDSA) may be used to generate the public-private key pair. The user agent 200 provides the public key of the user to the first identity provider 130-1.

The first identity provider 130-1 then generates a certificate (called User_Certificate1) signed with the private key of the first identity provider 130-1. The certificate is then provided back to the user agent 200. An example certificate 204 for User_Certificate1 includes identity information 204-1 of the user, a public key 204-2 of the user, and an identifier 204-3 of the first identity provider 130-1. For example, the identifier may be a domain name (such as www.live.com).

The identity information 204-1 may be a unique identifier that is a key value of a database maintained by the first identity provider 130-1. The identity information 204-1 may include additional information such as a username, real name, and/or email address of the user. The user certificate may include an intermediate certificate in scenarios where the first identity provider 130-1 stores the private key corresponding to a preinstalled certificate offline. The certificate 204 would then be signed not by the primary private key of the first identity provider 130-1 but by the intermediate private key associated with the intermediate certificate.

Figure 4B:
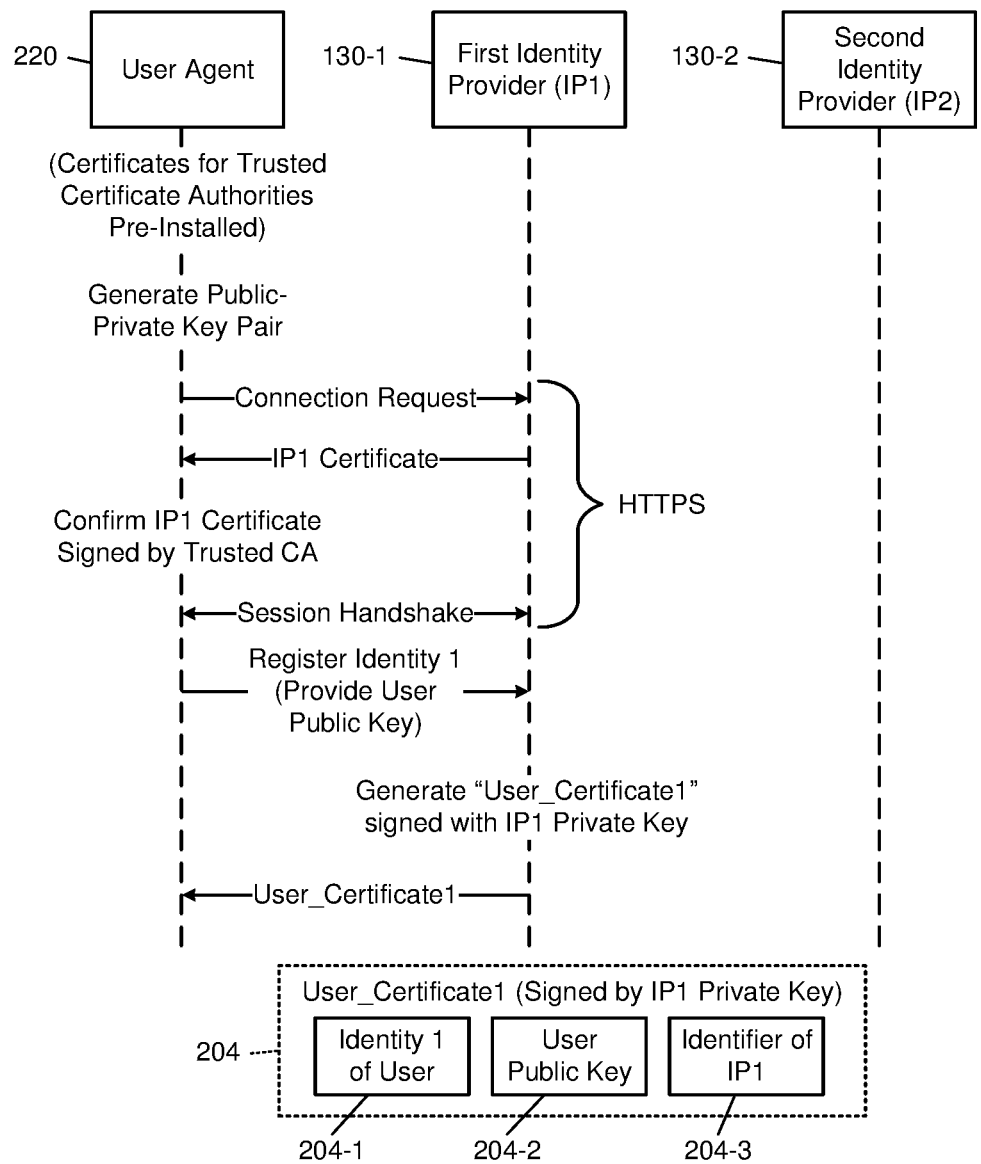
FIG. 4B is a message sequence chart demonstrating a user agent obtaining a certificate from an identity provider where the identity provider is vouched for by an existing Certificate Authority.

FIG. 4B demonstrates a transitional scenario in which the certificates for identity providers may not yet be installed on some or all user devices. The situation in FIG. 4B may also occur when new identity providers are created and the corresponding certificate is therefore not trusted and installed on many devices.

In the example shown, a user agent 208, which may execute on the user device 120-1, includes certificates for trusted certificate authorities preinstalled. For example, these trusted certificate authorities may be those currently trusted by mainstream browsers. For example, one of the certificate authorities may be the Comodo Group. Similar to FIG. 4A, the user agent generates a public-private key pair and sends a connection request to the first identity provider 130-1. The first identity provider 130-1 responds with a certificate. The user agent 208 confirms that the certificate was signed by one of the trusted certificate authorities. Upon confirmation of the certificate, the session handshake proceeds and the user agent 208 registers the user's identity with the first identity provider 130-1. The resulting certificate may be the same as the certificate 204 of FIG. 4A.

Figure 5:
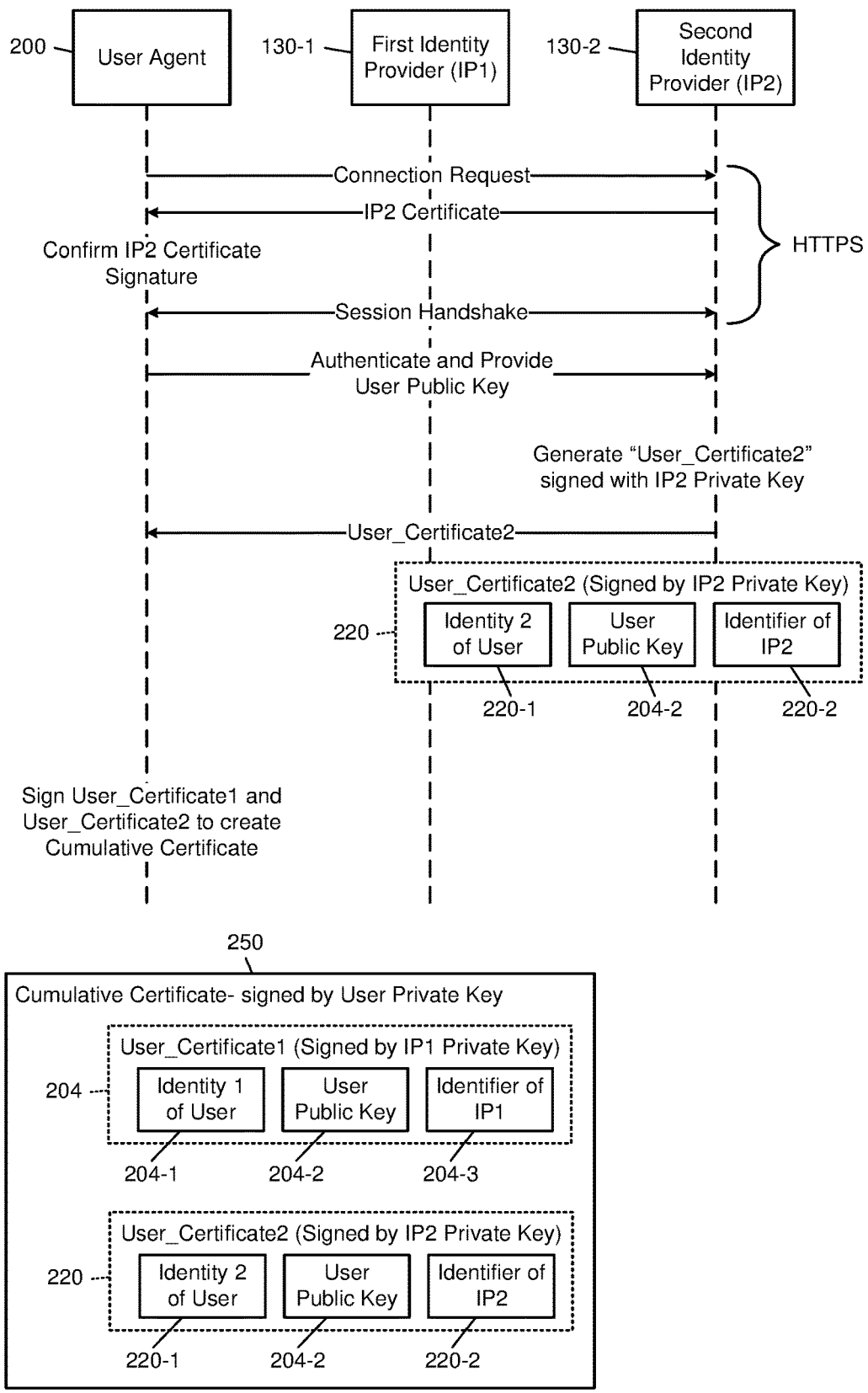
FIG. 5 is a message sequence chart demonstrating a user agent obtaining a certificate from a second identity provider and creation of a cumulative certificate.

In FIG. 5, the user agent 200 registers the user's identity with the second identity provider 130-2. First, the user agent 200 sends a connection request to the second identity provider 130-2. The second identity provider 130-2 responds with a certificate that the user agent 200 is able to confirm as described above. For example, the user agent 200 may confirm that the certificate is identical to the preinstalled certificate or that the certificate was signed by the private key corresponding to the public key in the preinstalled certificate. The user agent 200 can then perform a session handshake with the second identity provider 130-2 to establish an encrypted communication channel.

In the scenario shown in FIG. 5, the user agent 200 has already registered its identity with the second identity provider 130-2. For example, the user may already be a user of the second identity provider 130-2. The second identity provider 130-2 then requires the user agent 200 to authenticate before the user agent 200 can provide the public key of the user. The authentication required by the second identity provider 130-2 may be the most rigorous available to the second identity provider 130-2 to ensure that another user, inadvertently or maliciously, does not associate a different public key with the user's identity.

For example, the second identity provider 130-2 may require two factor authentication even if the user agent 200 was previously trusted by the second identity provider 130-2 and had an unexpired token allowing access to the second identity provider 130-2. In addition, the second identity provider 130-2 may pose security questions, which may have been preconfigured by the user or may be based on information that an actor other than the user would have difficulty obtaining, such as financial information.

Upon successful authentication, the second identity provider 130-2 generates a certificate incorporating the user's public key and provides that certificate to the user agent 200. An example certificate 220 is shown and includes identity information 220-1 of the user according to the second identity provider 130-2. The certificate 220 also includes the public key 204-2 of the user and an identifier 220-2 of the second identity provider 130-2.

The identity information 220-1 of the user may be a unique identifier specific to the second identity provider 130-2. In other implementations, the identity information 220-1 may be globally unique to the user and may then be used across identity providers common with the identity information 204-1 of the user. The identity information 220-1 may also indicate the name, handle, email address, etc., of the user as specified by the second identity provider 130-2.

The user agent 200 may combine the certificate 204 and the certificate 220 into a cumulative certificate 250 and sign the cumulative certificate 250 using the private key of the user. By signing the cumulative certificate 250, the user indicates that the certificate 204 and the certificate 220 were created on behalf of the user and not surreptitiously by the first identity provider 130-1 or the second identity provider 130-2.

Delegation

Figure 6A:
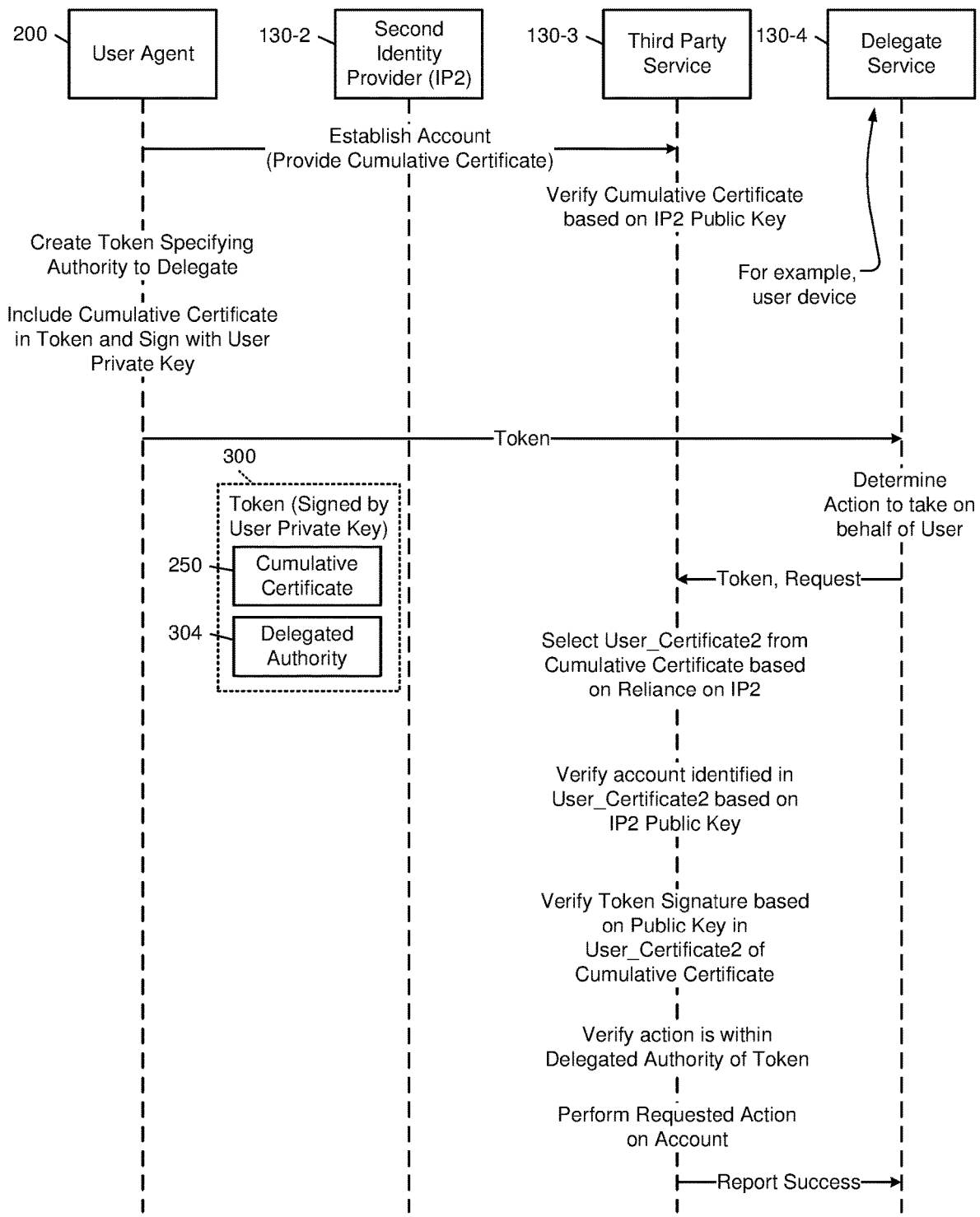
FIG. 6A is a message sequence chart demonstrating example delegation of authority to a delegate for taking action on behalf of the user agent.

In FIG. 6A, the user agent 200 has a relationship with the third party service 130-3. For example, the third party service 130-3 may be an email provider. The user agent 200 delegates some authority to control the third party service 130-3 to the delegate service 130-4. The delegate service 130-4 is named with the term delegate simply because in this example the user agent 200 is delegating authority to the delegate service 130-4. In other examples, the user agent 200 may delegate authority to the third party service 130-3 and the delegate service 130-4 may simply be a stand-alone service.

In other examples, the delegate service 130-4 may actually be a device owned by the user. For example, the delegate service 130-4 may be a thermostat of the user which has been delegated authority by the user to send emails using the third party service 130-3. In this way, the delegate service 130-4 can send an email via the third party service 130-3 to a contractor if service is needed on an HVAC (Heating, Ventilation, and Air Conditioning) system at the user's residence.

FIG. 6A shows the user agent 200 establishing an account with the third party service 130-3. This account may be established by providing the cumulative certificate 250. In this example, the third party service 130-3 relies on the second identity provider 130-2 and therefore verifies the certificate 220 within the cumulative certificate 250 against the public key of the second identity provider 130-2, which is already known to the third party service 130-3.

When the user agent 200 decides to delegate authority to the delegate service 130-4, the user agent 200 creates a token specifying the authority to delegate. For example, the user may explicitly direct the user agent 200 to delegate the authority, or the user agent 200 may programmatically delegate the authority in response to a request by the user to perform an action that requires such delegation. The token includes the cumulative certificate and is signed with the user's private key. An example token 300 is shown to include the cumulative certificate 250 and an indication 304 of delegated authority.

The token is sent to the delegate service 130-4 and the delegate service 130-4 is then able to perform some action with respect to the third party service 130-3 on behalf of the user. The user agent 200 may already have established a relationship with the delegate service 130-4. The token may indicate to the delegate service 130-4 how to access the third party service 130-3, which may be included as part of the indication 304 of delegated authority. In other implementations, the user agent 200 may separately inform the delegate service 130-4 of how to communicate with the third party service 130-3.

When the delegate service 130-4 determines what action to take on behalf of the user, the delegate service 130-4 sends the token to the third party service 130-3 along with an indication of the action to be performed. In some implementations, the indication 304 of delegated authority will include the public key of the delegate service 130-4. The delegate service 130-4 can then sign the request with the corresponding private key of the delegate service 130-4 to establish that the token has not simply been intercepted and misappropriated by some other party.

The third party service 130-3 relies on the second identity provider 130-2 and therefore selects the certificate 220 from the cumulative certificate 250 included in the token 300. The third party service 130-3 can therefore validate the signature of the token 300. Next, the third party service 130-3 verifies that the action requested by the delegate service 130-4 is within the indication 304 of the delegated authority of the token 300. The third party service 130-3 may also verify the account that the user agent 200 has with the third party service 130-3 based on the identity specified in the certificate 220.

The third party service 130-3 performs the request action and reports success to the delegate service 130-4 if (i) the third party service 130-3 has an account for the identity specified in the token, (ii) the token authorizes the action, and (iii) the requestor is a subject of the delegation. In another example, the delegate service 130-4 may be a build server that compiles software projects on behalf of the user. The user may have delegated to the delegate service 130-4 the ability to perform pull requests from a software code repository hosted by the third party service 130-3. Continuing the example, the user may also have delegated, to the delegate service 130-4, an ability to post a message indicating build success to a messaging platform (not shown).

Figure 6B:
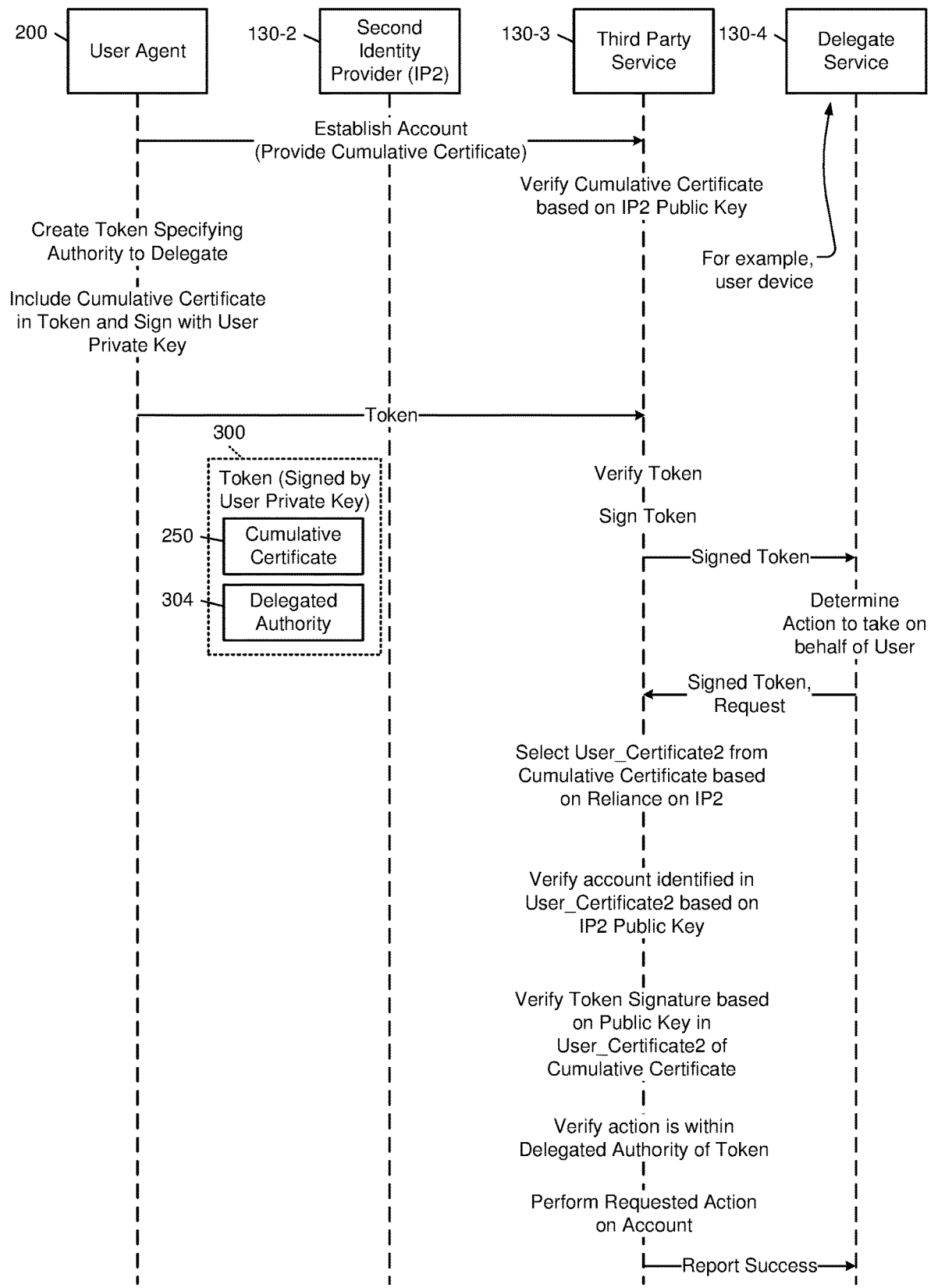
FIG. 6B is a message sequence chart demonstrating delegation when a third party at which action is taken signs a token delegating authority to the delegate.

In FIG. 6B, the user agent 200 first sends the token 300 to the third party service 130-3 and the third party service 130-3 verifies the token. In other words, the third party service 130-3 verifies that an identity provider the third party service 130-3 trusts (in this case, the second identity provider 130-2) has signed a certificate included in the token 300. The third party service 130-3 then signs the token and provides the signed token to the delegate service 130-4. The remainder of FIG. 6B proceeds similarly to what is shown in FIG. 6A.

Figure 6C:
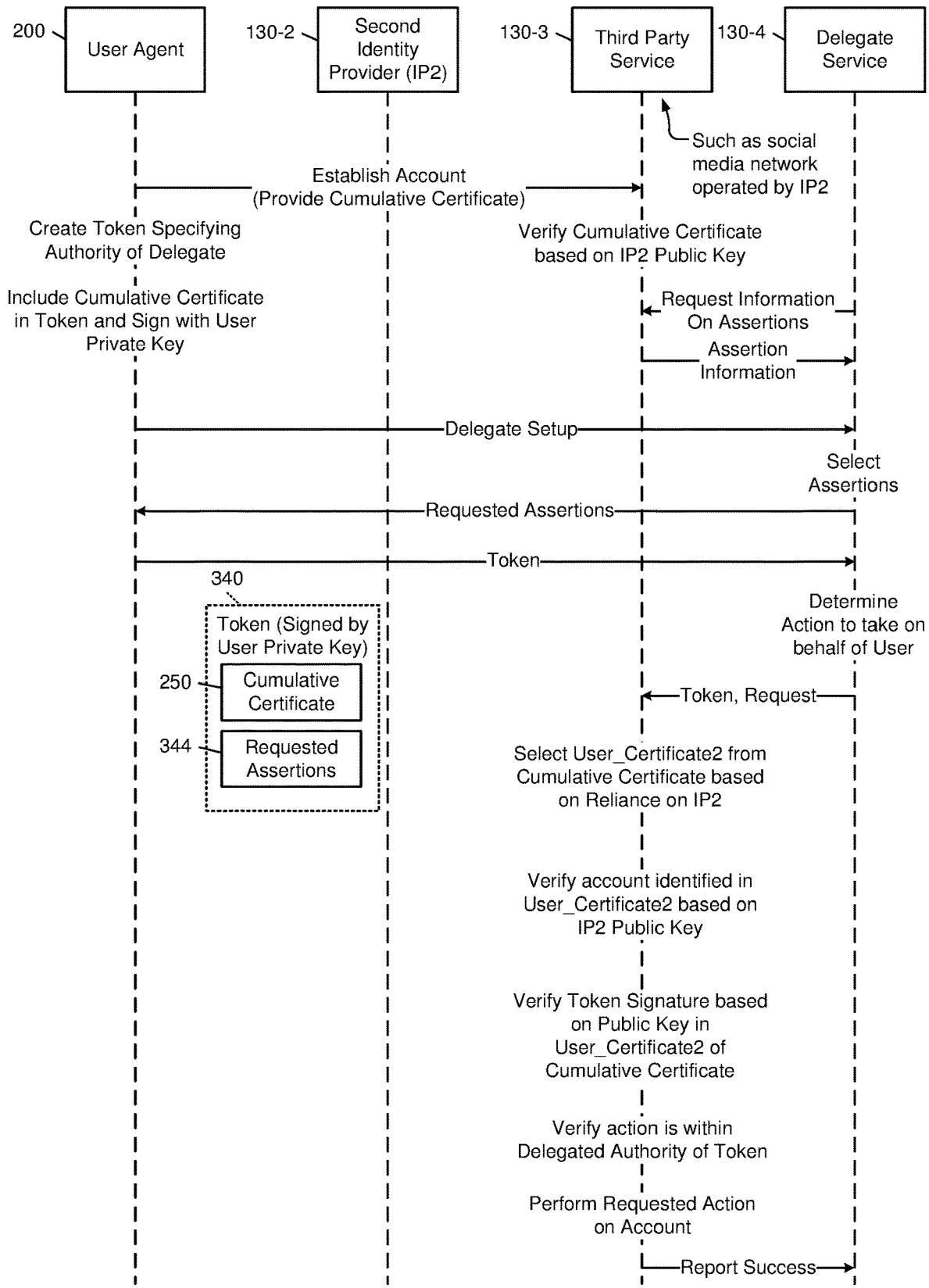
FIG. 6C is a message sequence chart demonstrating a delegate determining assertions relied on by a third party so that the user agent can delegate authority including those assertions.

In FIG. 6C, the delegate service 130-4 determines what assertions the third party service 130-3 accepts, determines a subset of those assertions the delegate service 130-4 may need, and provides those to the user agent 200. For example, the third party service 130-3 may accept an assertion that the delegate service 130-4 is authorized to send email to a specific recipient. This assertion may require a specific format. For example, assertions may be specified using the Security Assertion Markup Language (SAML). The third party service 130-3 may also accept an assertion that the delegate service 130-4 is able to look up a statistic about the user, such as a count of how many messages the user has posted using the third party service 130-3 in the last twenty-four hours.

The delegate service 130-4 can then provide information about these assertions to the user agent 200 so that the user agent 200 can provide the correctly formatted assertions to the delegate service 130-4. In other words, the user agent 200 may not be able to simply provide a string of plain text telling the delegate service 130-4 that emails can be sent via the third party service 130-3. Instead, a specific assertion specifying an action to be performed may have to follow a predefined grammar. The user agent 200 then needs to provide this specific assertion within a token in order for the third party service 130-3 to accept that token.

Therefore, in FIG. 6C, as compared to FIG. 6A and FIG. 6B, the delegate service 130-4 requests information on assertions accepted by the third party service 130-3. The delegate service 130-4 selects necessary assertions for services that the third party service 130-3 will provide to the delegate service 130-4. The delegate service 130-4 specifies the format of the required assertions and the user agent 200 constructs a token 340 that includes a list 344 of the requested assertions. The token 340 also includes the cumulative certificate 250 of the user.

As an alternative to FIG. 6B, the third party service 130-3 may not sign and forward the token to the delegate service 130-4. Instead, the third party service 130-3 may simply store the token for future use. For example, the token may be stored and indexed by a domain name of the delegate service 130-4. The domain name of the delegate service 130-4 would be included in the indication 304 of the delegated authority. Then, when the third party service 130-3 receives a request from the delegate service 130-4, the third party service 130-3 can determine whether any tokens are stored corresponding to the delegate service 130-4 and associated with the user.

In other words, the delegate service 130-4 would not receive a token (signed or otherwise) and it would not provide a token to the third party service 130-3. Instead, the delegate service 130-4 would be informed that it has been authorized to perform actions on behalf of the user and it would trust that the third party service 130-3 has been configured accordingly.

Connected Devices

Figure 7:
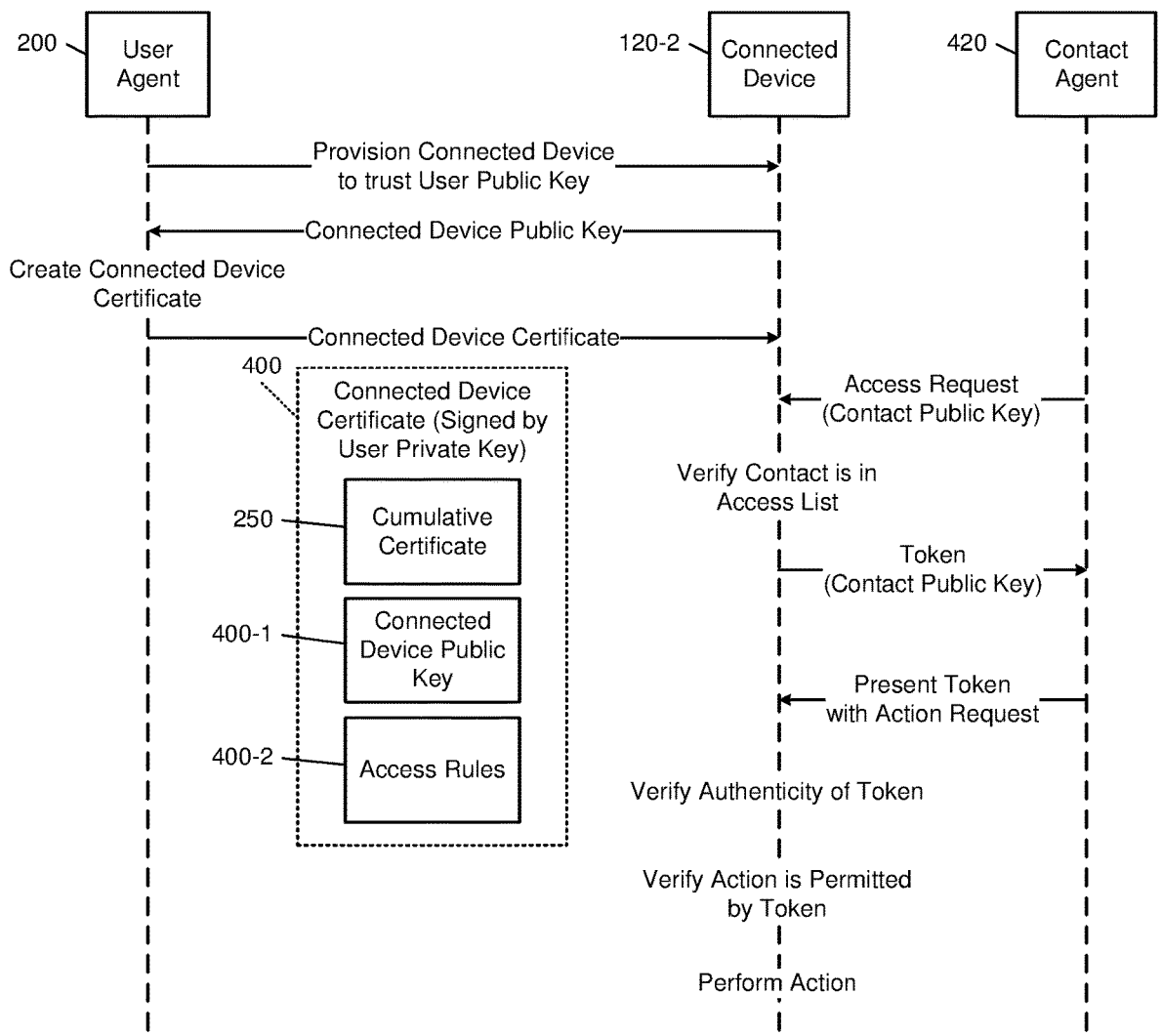
FIG. 7 is a message sequence chart demonstrating authorization of a connected device to be controlled by a third party.

In FIG. 7, the connected device 120-2 is installed and set up by the user agent 200. Installation may be as simple as connecting the connected device 120-2 to a wireless network accessible by the user agent 200. In fact, installation may simply be powering on or unboxing the connected device 120-2. Connection to the wireless network may be facilitated by the user agent 200. For example, the user agent 200 may obtain the public key of the connected device 120-2 and provide that public key to a wireless router to permit wireless access by the connected device 120-2.

Regardless of whether the user agent 200 communicates directly with the connected device 120-2 using a point-to-point protocol or whether communication occurs over a local area network, initial setup of the connected device 120-2 includes provisioning the connected device to trust the user's public key. This provisioning may be permanent or may be able to be overridden by a factory reset.

The connected device 120-2 provides its public key to the user agent 200. The public key may be programmed into the connected device 120-2 at the time of manufacturing or distribution, or may be generated as part of the provisioning step. The user agent 200 creates a connected device certificate corresponding to the connected device 120-2.

An example connected device certificate 400 includes the cumulative certificate 250, the connected device public key 400-1 and access rules 400-2. For example, the access rules 400-2 may specify public keys of other parties permitted to access the connected device 120-2. In the smart lock context, the access rules 400-2 may specify who is permitted to unlock the smart lock and for how long that permission lasts. In various implementations, the connected device public key 400-1 may be omitted to allow the user agent 200 to provision multiple connected device without having to customize the connected device certificate 400 for each connected device.

When present, the connected device public key 400-1 prevents the connected device certificate 400 from being presented by a device other than the connected device 120-2. For example, in a case where the connected device 120-2 is a wireless access point (or wireless router) the connected device public key 400-1 prevents a rogue wireless access point from impersonating the connected device 120-2 by presenting the connected device certificate 400 to agents attempting to access the connected device 120-2.

The user agent 200 provides the connected device certificate 400 to the connected device 120-2. Then, when a contact agent 420 (an agent of one of the user's contacts) sends an access request to the connected device 120-2, the connected device 120-2 can determine whether the contact is listed within the access rules 400-2. For example, the contact agent 420 may be executing on the contact device 120-4 shown in FIG. 1.

The connected device 120-2, once the contact agent 420 is verified, provides an access token to the contact agent 420. The access token includes the public key of the contact. The contact agent 420 can then present the token with an action request. The connected device 120-2 verifies authenticity of the token and tracks whether the action is permitted by the token and/or the access rules 400-2 and, if so, performs the action.

The contact agent 420 may convey the token to another device under control of the contact, such as a wireless key fob in the case where the connected device 120-2 is a smart door lock. Then the wireless key fob, which may not implement the contact agent 420, can present the token to the connected device 120-2 to cause the connected device 120-2 to unlock a door.

Figure 8A:
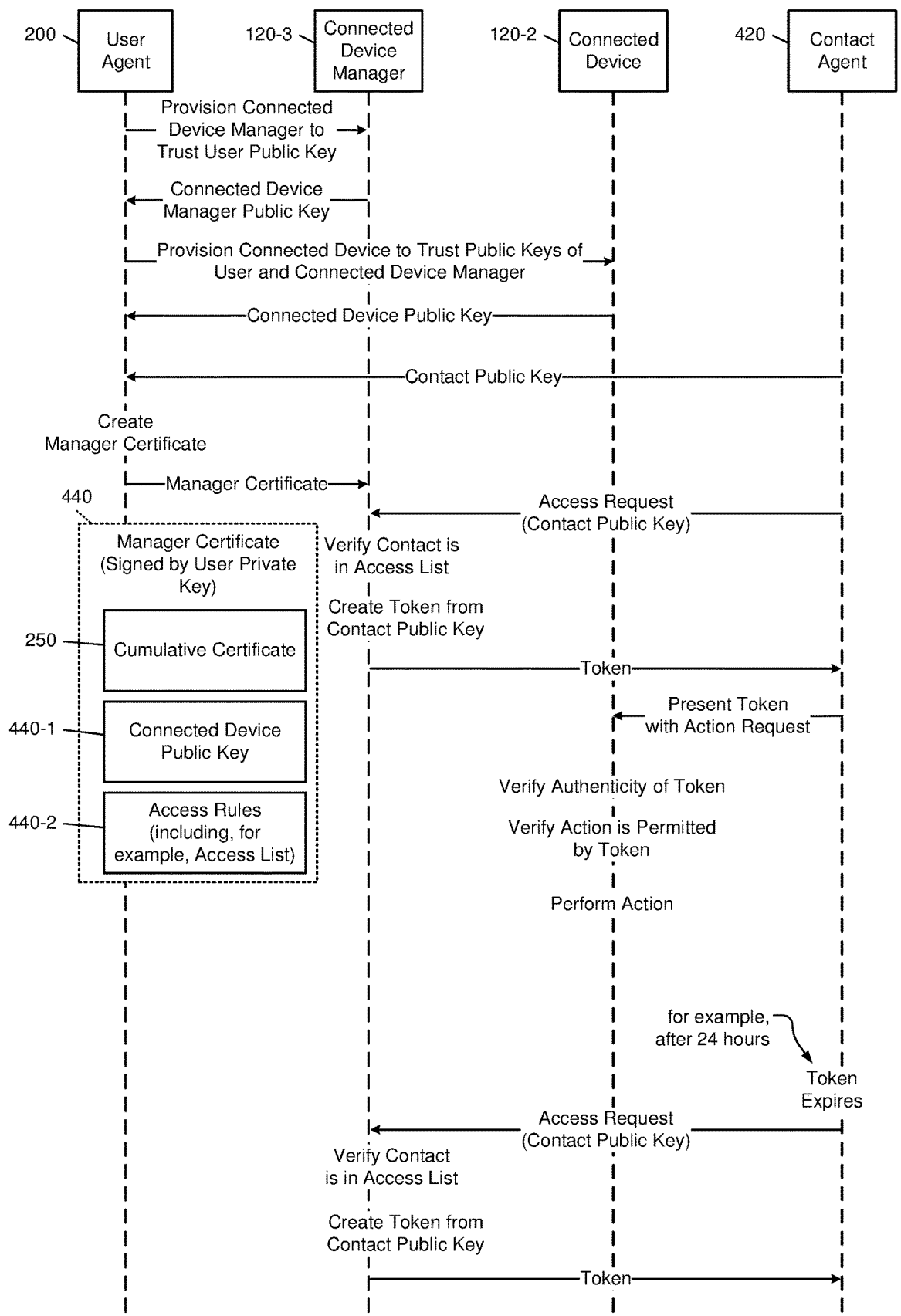
FIG. 8A is a message sequence chart demonstrating a connected device manager managing access to a connected device.

In FIG. 8A, a connected device manager 120-3 controls the connected device 120-2. At initial setup, the connected device manager 120-3 is provisioned by the user agent 200 with the user's public key. This causes the connected device manager 120-3 to treat the user as the entity that can control the connected device manager 120-3. To be more specific, the connected device manager 120-3 will take instruction from an entity that can prove possession of the private key corresponding to the trusted public key.

Meanwhile, the connected device manager 120-3 provides its own public key to the user agent 200. As part of initial setup of the connected device 120-2, the user agent 200 provisions the connected device 120-2 to trust the user and the connected device manager 120-3 by providing both public keys to the connected device 120-2. Provisioning may establish a hierarchy such that the public key of the user takes precedence over the public key of the connected device manager 120-3.

The connected device 120-2 also provides its own public key to the user agent 200. To control the connected device 120-2, the user agent 200 creates a manager certificate and provides the manager certificate to the connected device manager 120-3. An example manager certificate 440 includes the cumulative certificate 250, the connected device public key 440-1, and access rules 440-2.

The access rules 440-2 may include an access list of authorized contacts. In other instances, the access rules 440-2 may include a pointer to an access list, which can be modified without having to reissue the manager certificate 440. For example, the access list may be maintained by an identity provider. The user agent 200 can submit instructions to the identity provider regarding which contacts should be included in the access list. For example, the identity provider may maintain a list of contacts that the user agent 200 has specified have a certain class of relationship with the user of the user agent 200.

For example, when the identity provider is a social network, the identity provider may maintain a list of contacts that are considered close friends of the user, a list of contacts that are work colleagues of the user, a list of contacts that are school acquaintances of the user, etc. Further, the identity provider may maintain a list of contacts that are part of an interest group of which the user is a member, a list of contacts that have been invited to (or are attending) an event, etc. The access rules 440-2 may point to one of these lists maintained at the identity provider or may point to a set operation of certain lists (for example, the intersection of the close friends list with a particular event list).

Then, when the contact agent 420 sends an access request to the connected device manager 120-3, the connected device manager 120-3 verifies that the contact is authorized by the access rules 440-2. The connected device manager 120-3 generates a token and provides that token to the contact agent 420. The token includes identity information of the connected device 120-2 (in other words, the public key of the connected device 120-2), the public key of the contact agent 420, and optionally other metadata, such as an expiration date.

The contact agent 420 can present the token with an action request to the connected device 120-2. The token is signed by the connected device manager 120-3 and, because the connected device 120-2 was provisioned to trust the public key of the connected device manager 120-3, the connected device 120-2 can perform the action consistent with the token.

If the token expires (such as after 24 hours), the connected device manager 120-3 can verify that the contact is still in the access list and issue a new token (with a new expiration time) based on the manager certificate 440 to the contact agent 420. Because of this ability, the manager certificate 440 may therefore be called a refresh token. The manager certificate 440 may have an infinite lifetime (existing until revoked by the user agent 200) or may have a specified duration, which may be, as examples, one month or one year.

Figure 8B:
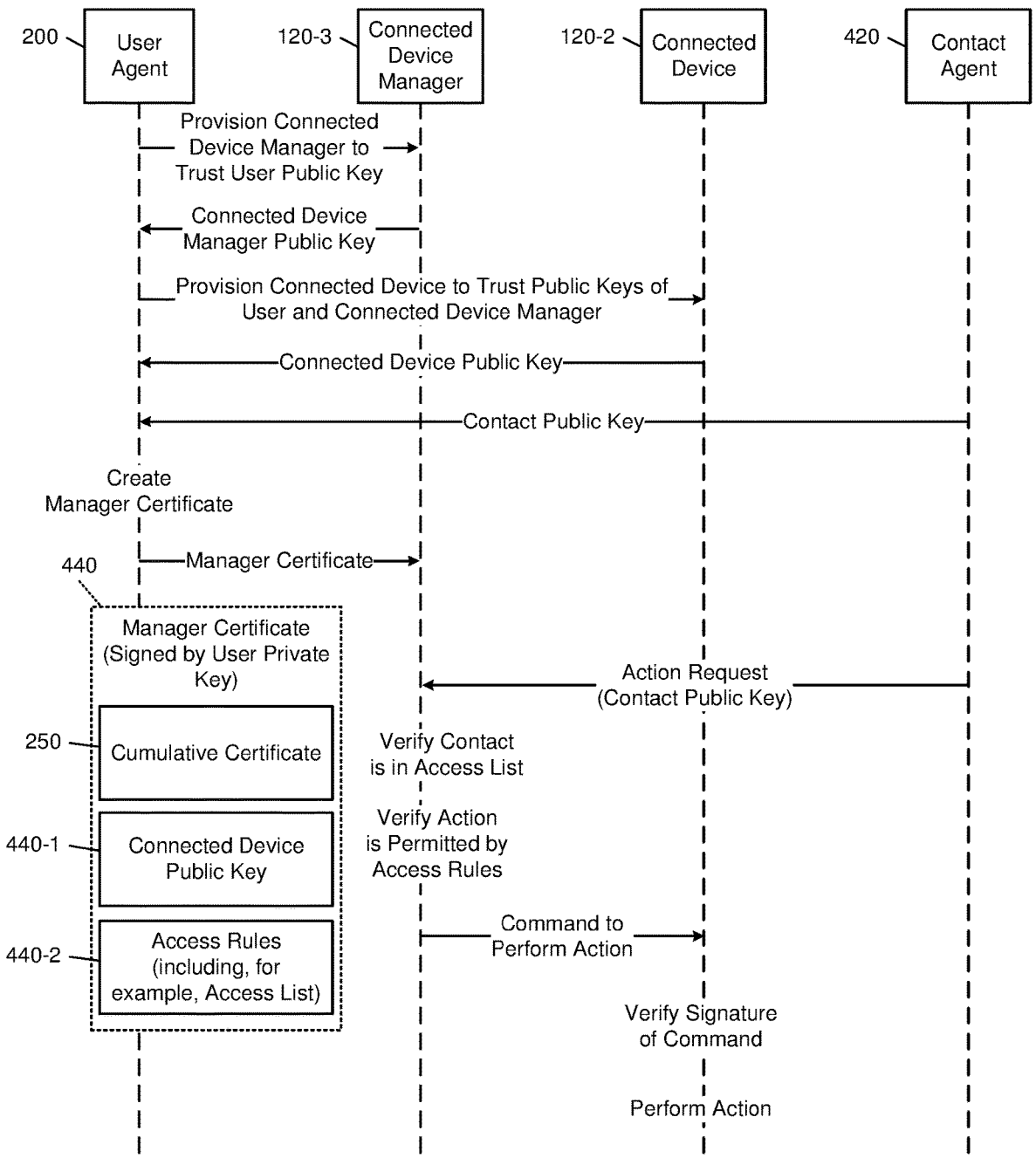
FIG. 8B is a message sequence chart demonstrating a connected device manager controlling a connected device on behalf of an authorized third party.

In FIG. 8B, the connected device 120-2 may be controlled exclusively by the connected device manager 120-3, where the contact agent 420 does not communicate with the connected device 120-2. As a result, the contact agent 420 sends an action request to the connected device manager 120-3. If the connected device manager 120-3 determines that the action is authorized, the connected device manager 120-3 sends a corresponding command to the connected device 120-2. The command is signed by the private key of the connected device manager 120-3 since the connected device 120-2 was provisioned to trust the corresponding public key.

Figure 9:
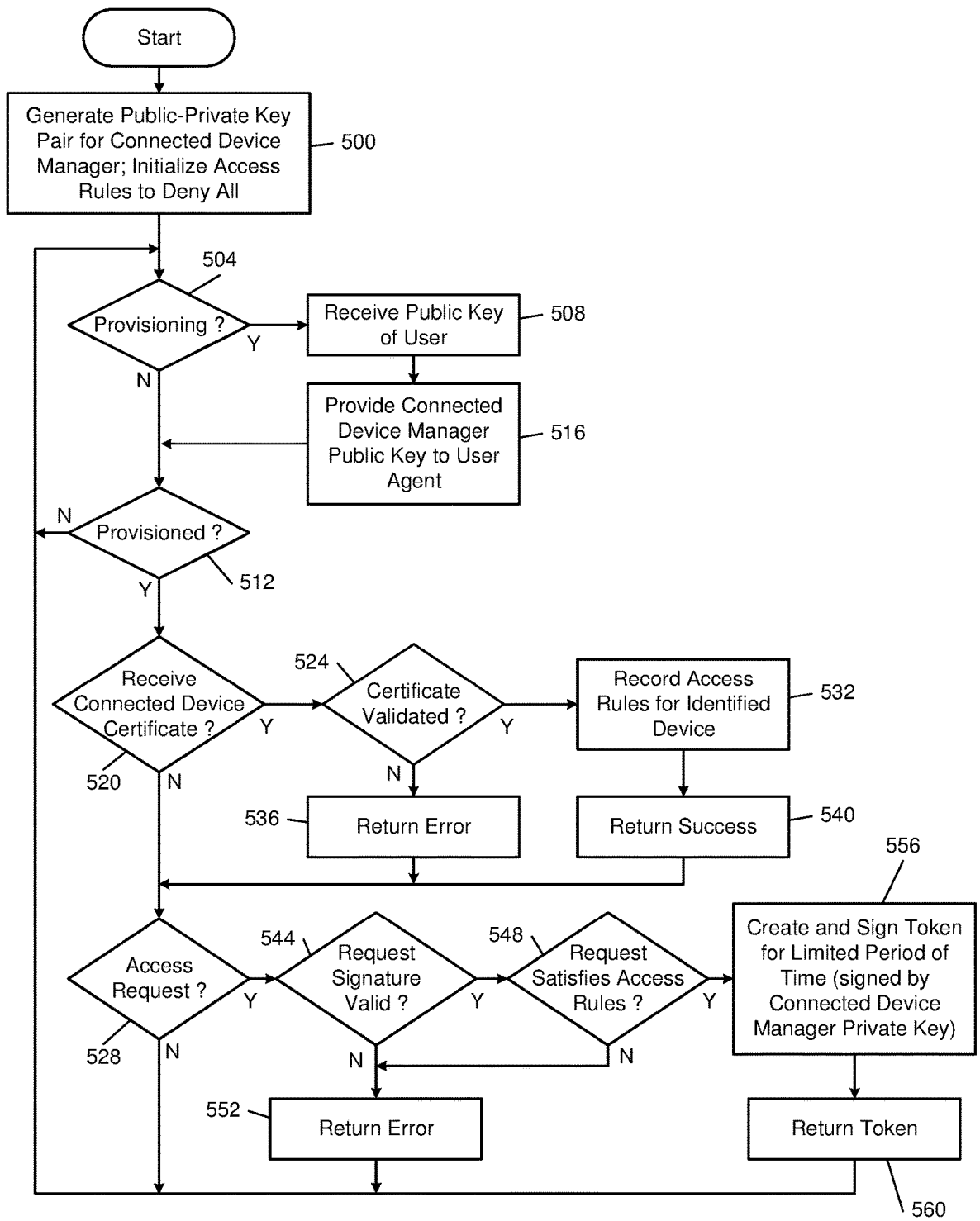
FIG. 9 is a flowchart of example operation of a connected device manager as shown in FIG. 8C.

In FIG. 9, example control performed by the connected device manager 120-3 is depicted. Control begins at 500, upon first powering up. Control generates a cryptographic public-private key pair and initializes access rules to deny all for all connected devices. For example only, control may generate the cryptographic public-private key pair using an asymmetric key algorithm, such as RSA, and may specify a key size of from 384 bits to 16384 bits in increments of 8 bits.

At 504, if the connected device manager is undergoing initial provisioning, control transfers to 508; otherwise, control transfers to 512. At 508, control receives the public key of the user, which establishes control of the connected device manager by the user. The public key is stored for use in validating any future control commands sent to the connected device manager. Provisioning may be indicated by receiving a provisioning command at the connected device manager. The provisioning command may be transmitted by a device under control of the user. The provisioning command may also include information needed by the connected device manager to obtain wireless network access.

To prevent provisioning by a malicious remote party, the provisioning command may only be accepted over a short-range wireless protocol, such as Blutetooth. In other implementations, the provisioning command may only be accepted when it includes specific indicia, such as a code printed on the connected device manager or data obtained from a computer-readable code (such as a QR code) printed on the connected device manager.

Re-provisioning may be necessary if the connected device manager is sold or if the user obtains a new public key. In various implementations the connected device manager can only be provisioned once—re-provisioning requires performing a hardware reset on the connected device manager. In other implementations, the connected device manager can be re-provisioned if physical access to the connected device manager is available. For example, pressing a physical button on the connected device manager may cause the connected device manager to accept a provisioning command for a limited period of time, such as 60 seconds.

Control continues from 508 to 516. At 516, control provides the connected device manager's public key to the user. The connected device manager's public key can be used by an agent of the user to indicate that a certificate is targeted to the connected device manager. Control then continues at 512. If the connected device manager has been provisioned, control can continue to 520; otherwise, control returns to 504.

At 520, control determines whether a connected device certificate has been received. If so, control transfers to 524; otherwise, control continues at 528. At 524, control determines whether the certificate can be validated. If so, control transfers to 532; otherwise, control transfers to 536. Control validates the certificate by checking that the certificate was signed by the private key corresponding to the user's public key recorded at 508.

At 532, control records the access rules specified in the certificate for the connected device identified by the certificate. For example, the connected device may be identified by its public key. Control may maintain a table of connected device public keys, where each connected device public key corresponds to a set of authorized users. The table may begin with zero rows, or may be pre-populated with a set of keys for all connected devices that are associated with the connected device manager.

For each row of the table, a set of authorized users may be specified as a linked list of public keys for the authorized users. When there are no authorized users for a connected device, the set is the empty set. In various implementations, the table may be stored in a relational database or NoSQL database.

The table may include additional information, such as an expiration time for each token the connected device manager generates. The expiration time may be specified for each connected device—as an example, a token used to open the door of a residence may be set to expire after 24 hours, while a token used to open a gym locker may be set to expire after 7 days. Additionally or alternatively, the expiration time may be set per authorized device—for an authorized user that is a roommate, the expiration time of a smart lock token may be 48 hours, while for an authorized user that is a party guest, the expiration time for a smart lock token may be 4 hours.

Control continues at 540, where control returns a success message to the sender of the connected device's certificate. Control then continues at 528. Meanwhile, at 536, control returns an error status to the sender of the connected device certificate and control continues at 528.

At 528, control determines whether a token request has been received. If so, control transfers to 544; otherwise, control returns to 504. At 544, control determines whether the signature of the token request is valid. If so, control transfers to 548; otherwise, control transfers to 552. At 548, control determines whether the requestor satisfies access rules set for the device identified in the token. If so, control transfers to 556; otherwise, control transfers to 552.

At 556, control creates a token for a limited period of time. The token may include the public key of the requestor to indicate that the token can be only be used by the requestor. In addition, the token includes the public key of the connected device specified in the token request. This indicates that the token is limited to that particular connected device. Control signs the token using the private key of the connected device manager. Control continues at 560, where the token is returned to the requestor. Control then returns to 504. Meanwhile, at 552, control returns an error signal to the requestor of the token and returns to 504.

Specifying Trust

Figure 10A:
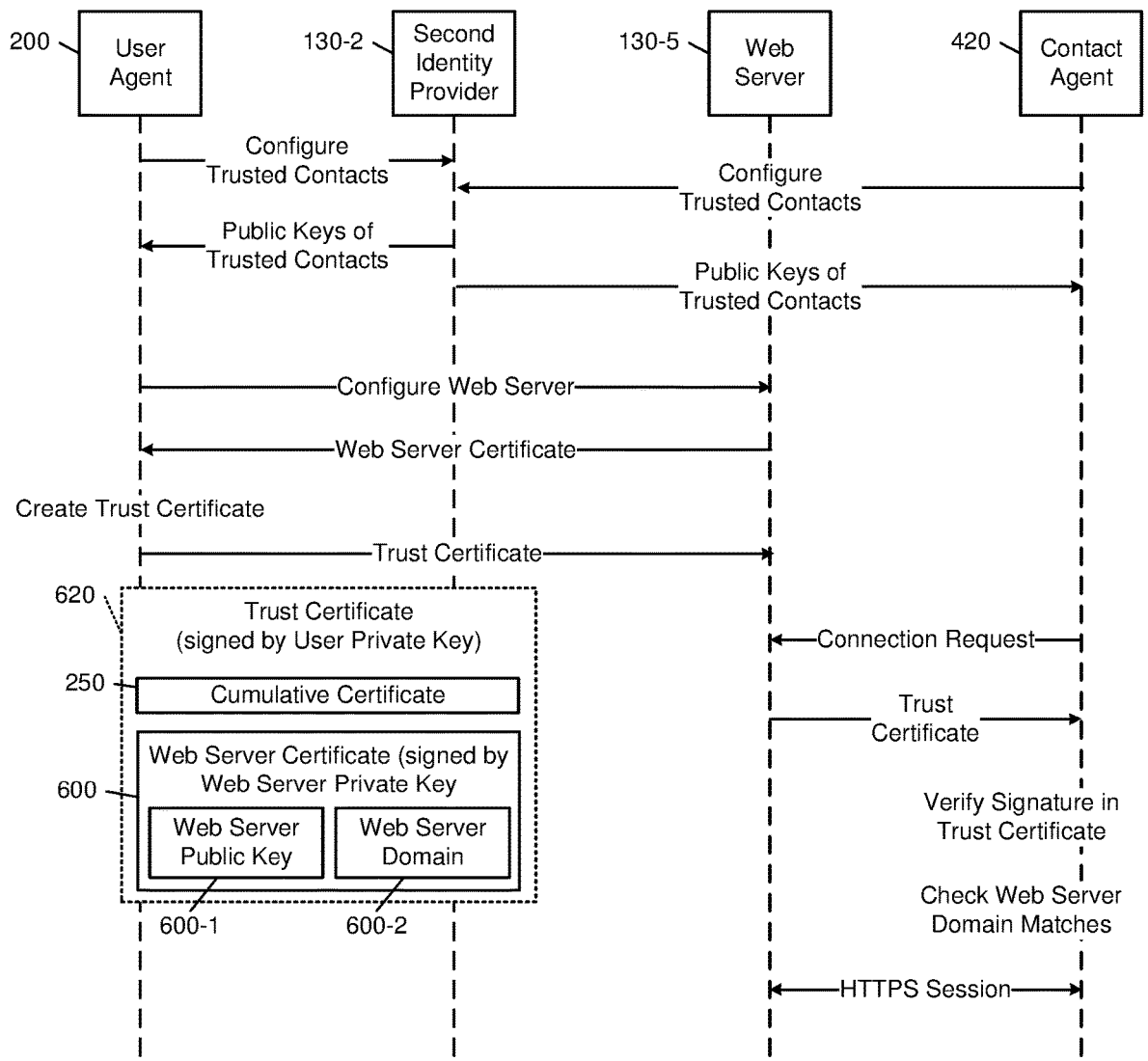
FIG. 10A is a message sequence chart demonstrating an entity inheriting trust relationships from its trusted contacts.
Figure 10B:
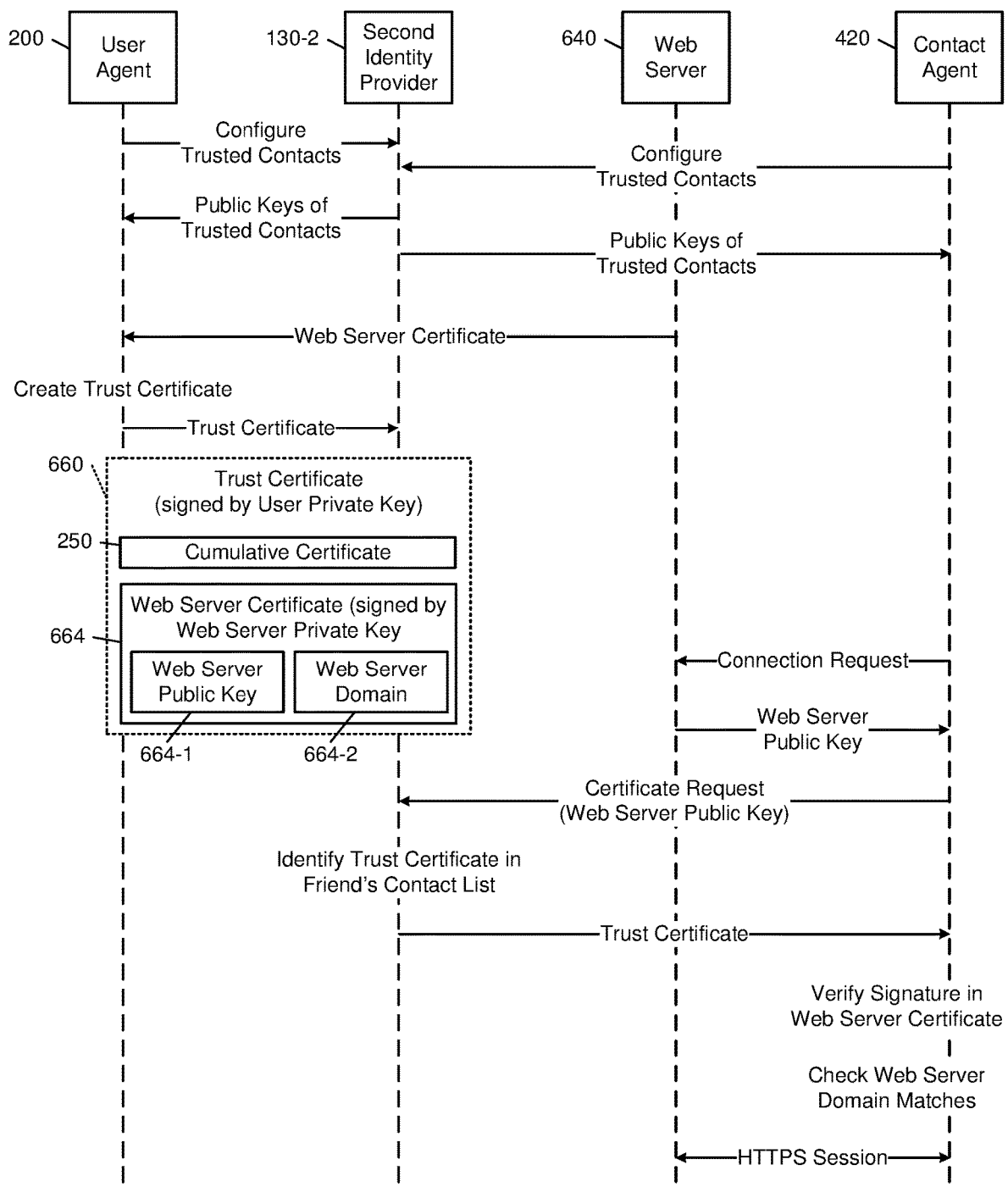
FIG. 10B is a message sequence chart demonstrating placing trust in the services operated by one's trusted contacts.

In FIG. 10A and FIG. 10B, the user's role as an intermediate certificate authority is used not for the purpose of delegating authority or authenticating commands, but for indicating trust to others. As shown in FIG. 10A, the user agent 200 may configure the second identity provider 130-2 with contacts of the user. For example, if the second identity provider 130-2 is a business-oriented social network, the trusted contacts of the user could be employees of the same company as well as other professional contacts.

The contact agent 420 may also establish a set of trusted contacts at the second identity provider 130-2. In the example shown in this disclosure, the contact agent 420 and the user agent 200 respectively include each other in their sets of trusted contacts. This is true at least with respect to the second identity provider 130-2. In certain situations, the user agent 200 and the contact agent 420 may not be listed in each other's sets of contacts within the first identity provider 130-1, such as when the first identity provider 130-1 is a more personally-oriented social networking service and the user agent 200 and the contact agent 420 do not have a close personal relationship. The set of trusted contacts at the second identity provider 130-2 may include not just humans, but businesses with which the user has a relationship. For example, the user may indicate trust in certain businesses that have a presence on the second identity provider 130-2 by following, liking, or otherwise associating with the businesses.

The user agent 200 may maintain a set of public keys of trusted contacts provided by the second identity provider 130-2. Similarly, the public keys for the trusted contacts of the contact agent 420 are provided to the contact agent 420 by the second identity provider 130-2. The contact agent 420 may decide to trust any services operated by trusted contacts.

For example, a service may be a web server, such as the web server 130-5 of FIG. 1. In FIG. 10A, the user agent 200 configures the web server 130-5. For example, the web server 130-5 may serve as a showroom for handmade goods created by the user as a hobby. As part of configuring the web server 130-5, the web server 130-5 generates a public-private key pair and sends a web server certificate to the user agent 200.

An example web server certificate 600 includes a public key 600-1 of the web server 130-5 and a domain 600-2 of the web server 130-5. To indicate that the user agent 200 trusts the web server 130-5, the user agent 200 creates a trust certificate 620, which includes the cumulative certificate 250 as well as the web server certificate 600. In a simple implementation, the user agent 200 could simply provide its public-private key pair to the web server 130-5. Then, the public key of the web server 130-5 would match the public key of the user agent 200. However, in most instances this practice should be discouraged because then the private key of the user agent 200 would have broader exposure and therefore a larger attack surface.

In FIG. 10B, users can vouch for services that they themselves do not operate. For example, a web server 640 provides a web server certificate to the user agent 200. The user agent 200 may determine that the web server 640 is trustworthy and that the web server certificate is therefore valid. For example, the user agent 200 may make this determination based on long standing use of the web server 640 and/or indicia provided by the web server 640 indicating that the web server 640 has information that an imposter web server would not possess.

The user agent 200 can indicate its trust of the web server 640 by creating a trust certificate. An example trust certificate 660 includes the cumulative certificate 250 as well as a web server certificate 664. The web server certificate 664 includes a public key 664-1 of the web server 640 and a domain 664-2 of the domain name of the web server 640.

Figure 11:
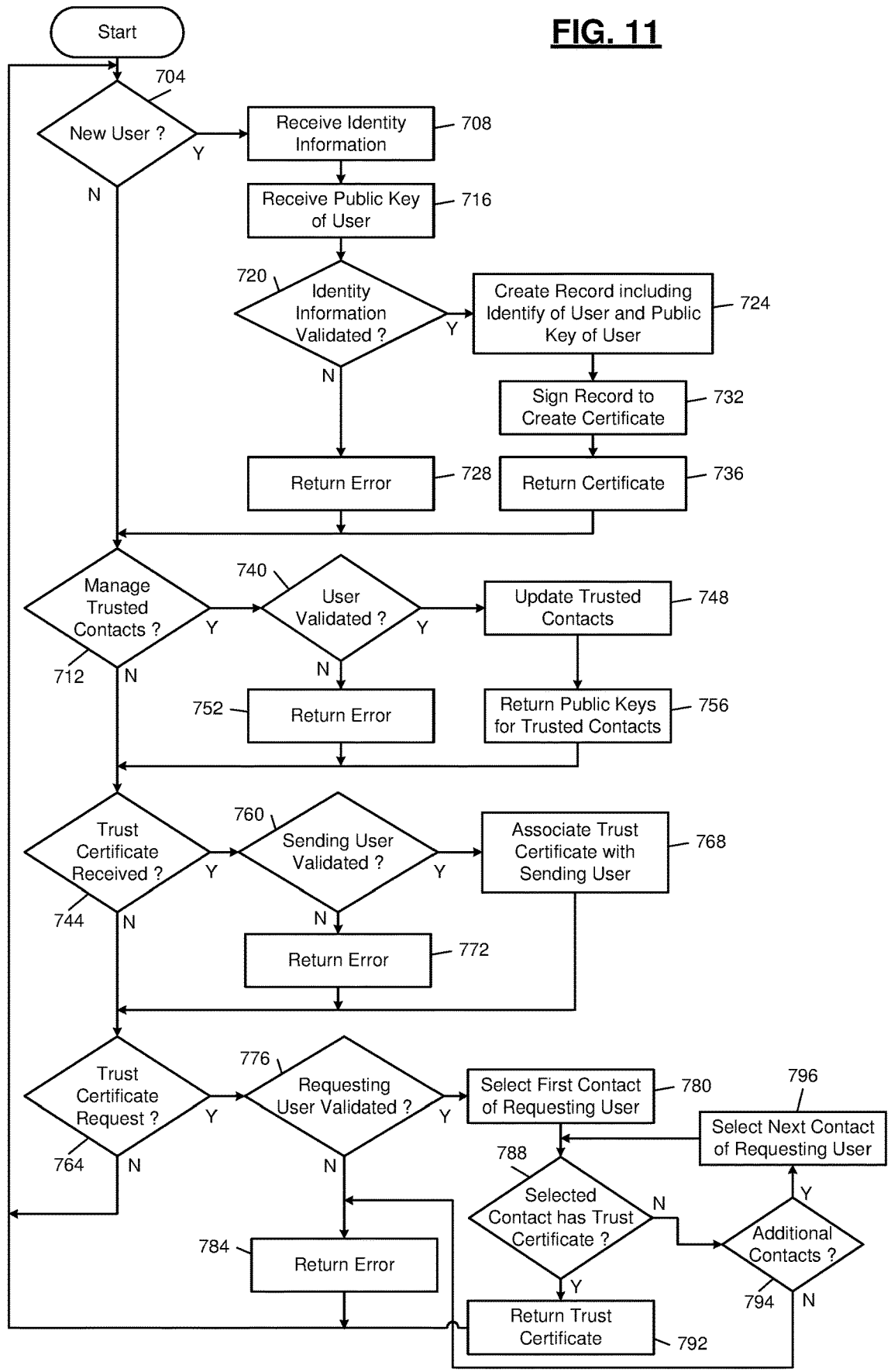
FIG. 11 is a flowchart of example operation of an identity provider as depicted in FIG. 5 and FIG. 10A.

In FIG. 11, example control performed by an identity provider consistent with FIG. 10B is depicted. Control begins at 704, where if a new user is registering with the identity provider, control transfers to 708; otherwise, control transfers to 712. At 708, control receives identity information from the user, such as an email address and username. Control continues at 716, where control receives the public key of the user.

At 720, control determines whether the identity information is validated. If so, control transfers to 724; otherwise, control transfers to 728. The identity information may be validated such as by insuring that a username is unique across the identity provider. Further, in some instances, a verification of the user's real name or age may be performed. For example, control may perform a nominal credit card transaction for verification purposes. At 728, control returns an error signal to the user and continues at 712. At 724, control creates a record including the identity of the user and the public key of the user. For example, this may be a record in an identity database or a user database. Control continues at 732, where control assigns a representation of that record to create a certificate for the user.

At 736, control transmits the certificate to the user and continues at 712. At 712, control determines whether the user (or the user's agent) is attempting to update the set of trusted contacts for the user. If so, control transfers to 740; otherwise, control transfers to 744. At 740, control determines whether the user has been validated. If so, control transfers to 748; otherwise, control transfers to 752.

The user may be validated by providing a username and password. After a previous validation (or, authentication), the identity provider may have placed a token or cookie on the device of the user (or within the user's web browser) so that the user would be trusted for a certain period of time or until that token or cookie was revoked. In other implementations, the user is validated based on providing a certificate signed by the private key of the user. The certificate either indicates that the holder of the certificate is authorized to manage the trusted contacts or may itself include a command to update the trusted contacts. In various implementations, control may provide a nonce (that is, a single-use random or pseudo-random value) to the user. Requiring that the signed certificate includes the nonce protects against replay attacks.

At 752, control returns an error message and continues at 744. At 748, control updates the trusted contacts for the user based on requests/instructions from the user. Control may maintain multiple sets of contacts for the user, and one or more of those sets may be designated as trusted at the request of the user. For example, the user may designate that a set of close friends and a set of family members are trusted sets. At 756, control optionally returns public keys corresponding to the set of trusted contacts to the user. Control then continues at 744.

In various implementations, the lists of trusted contacts for users may be made public by the identity provider. By public, this may mean to anyone with internet access, or to the subset of users with credentials from the identity provider. When a list of contacts is publicly available, the identity provider may provide the set of public keys corresponding to the list of contacts to any entity that makes a request. In other words, returning public keys for certain lists of contacts may be permitted without any validation of the requestor.

At 744, control determines whether a trust certificate has been received. If so, control transfers to 760; otherwise, control transfers to 764. A trust certificate indicates that a specific user (the one who signs the certificate) is willing to trust another entity, such as a web application or website. At 760, control determines whether the user sending the trust certificate has been validated. If so, control transfers to 768; otherwise, control transfers to 772.

At 772, control returns an error to the sender of the trust certificate and continues at 764. At 768, control associates the trust certificate with the sending user and completes at 764. The sending user may be validated by confirming that the user specified in the trust certificate signed the trust certificate. In other words, the public key associated with the user has a corresponding private key that was used to generate the trust certificate.

At 764, control determines whether a trust certificate request has been received for a specified target, such as a web site or web application. If so, control transfers to 776; otherwise, control returns to 704. At 776, control determines whether the requesting user can be validated. If so, control transfers to 780; otherwise, control transfers to 784. The requesting user may be validated by confirming that the request came from an authorized user of the identity provider. In addition, the requesting user's public key may be accessed to determine that the trust certificate request was signed by an entity holding a private key corresponding to that requesting user's public key. Validation may be required when the list of contacts for the requesting user is not public to avoid disclosing non-public data to an impersonator of the user. The requesting user may be a human or may be a non-human entity, such as a business.

At 784, the requesting user cannot be validated so control returns an error to the requestor and then returns to 704. At 780, control selects a first contact of the requesting user. This may be selected from all of the user's contacts or may be a subset of trusted contacts. For example, the user may indicate that some contacts (such as those who are more reliable or more technologically savvy) should be trusted.

Control continues at 788, where control determines whether the selected contact has a trust certificate corresponding to the target of the request. For example, control determines whether the selected contact has a trust certificate for the web server that the requestor is interested in communicating with. If the identity provider has a trust certificate from the selected contact, control transfers to 792; otherwise, control transfers to 794.

At 792, control sends the trust certificate to the requestor and continues at 704. At 794, control determines whether there are additional contacts for the requestor at the identity provider. If so, control transfers to 796; otherwise, control transfers to 784. At 796, control selects the next contact (such as from the set of trusted contacts) of the requesting user and returns to 788.

In other implementations, the decision of whether to transmit a trust certificate for a certain may be based on how many of the user's contacts have asserted trust in the target. There may be a percentage threshold (>50% of the user's trusted contacts) and/or an absolute threshold (>4 of the user's trusted contacts). The trust assertions of certain contacts may carry greater weight. For example, there may be a subset of contacts that, if any one of them asserts trust in the target, the target will be presumptively trusted by the user. Another subset of users may be assigned veto power—that is, if any of the users in such a subset fail to trust the target, then the target will not be trusted by the user and no trust certificate is sent to the user.

In other implementations, each contact may have an associated weight, and the weights of all contacts asserting trust in the target can be added and compared to a threshold. If that threshold is exceeded, then trust in the target can be inferred and a trust certificate returned to the user. A single trust certificate may be selected for transmission from among the trust certificates of the user's contacts.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A system comprising:
at least one processor; and
a computer-readable medium configured to store instructions for execution by the at least one processor, wherein the instructions include:
generating a user public key and a user private key, wherein the user public key and the user private key together form a cryptographic key pair for a first user;
registering an identity of the first user with a first identity provider, wherein registering the identity includes transmitting the user public key to the first identity provider;
in response to transmitting the user public key to the first identity provider, receiving a user certificate from the first identity provider, wherein the user certificate is signed by the first identity provider and includes the user public key and identity information corresponding to the identity of the first user;
identifying a set of trusted contacts, wherein the set of trusted contacts includes other users of the first identity provider;
generating a trust certificate for a web server and signing the trust certificate using the user private key, wherein the trust certificate includes an address of the web server and a public key of the web server; and
in response to an access request from the first user specifying a second web server:
contacting the second web server and receiving a second trust certificate from the second web server, wherein the second trust certificate includes a signature of the second trust certificate corresponding to one of the set of trusted contacts; and
in response to successful verification of the signature of the second trust certificate corresponding to the one of the set of trusted contacts with a public key corresponding to the one of the set of trusted contacts, establishing a connection with the second web server.

2. The system of claim 1 wherein:
the trust certificate for the web server includes the user public key; and
the instructions include transmitting the trust certificate to the web server.

3. The system of claim 1 wherein:
the instructions further include signing the user certificate using the user private key; and
the identity information includes at least one of (i) a username of the first user at the first identity provider, (ii) an email address of the first user, (iii) a real name of the first user, and (iv) a social media handle of the first user.

4. The system of claim 1 wherein the instructions include:
sending commands to the first identity provider to establish a first subset of the set of trusted contacts; and
receiving a public key for each of the first subset of the set of trusted contacts from the first identity provider, wherein the received public keys are stored for use in verifying trust certificate signatures.

5. The system of claim 1 wherein the instructions include, in response to the second trust certificate specifying a public key:
attempting to verify the signature of the second trust certificate corresponding to the one of the set of trusted contacts with the specified public key; and
in response to successful verification of the signature of the second trust certificate corresponding to the one of the set of trusted contacts with the specified public key, establishing the connection with the second web server in response to the specified public key matching the public key corresponding to the one of the set of trusted contacts.

6. The system of claim 1 wherein:
a public key of the first identity provider is pre-programmed into the system before communication is established with the first identity provider; and
the instructions further include establishing authenticity of the first identity provider based on the public key of the first identity provider.

7. The system of claim 1 wherein the set of trusted contacts includes at least one of:
people who are registered with the first identity provider and are known by the first user; and
businesses that are registered with the first identity provider and have a relationship with the first user.

8. The system of claim 1 wherein:
the user certificate was signed by a private key of the first identity provider;
the private key of the first identity provider corresponds to a public key of the first identity provider; and
the instructions further include verifying the user certificate using the public key of the first identity provider.

9. The system of claim 1 wherein the instructions further include:
obtaining a second user certificate from a second identity provider;
creating a cumulative certificate including the user certificate and the second user certificate; and
signing the cumulative certificate using the user private key,
wherein the set of trusted contacts selectively includes users of the second identity provider.

10. An identity provider system comprising:
at least one processor; and
a computer-readable medium configured to store instructions for execution by the at least one processor, wherein the instructions include:
storing information regarding an identity of a first user, wherein the information includes a unique identifier of the first user;
receiving a user public key from the first user, wherein the user public key and a user private key together form a cryptographic key pair for the first user;
associating the unique identifier with the user public key;
generating a certificate including the user public key and the unique identifier;
signing the certificate using a private key of the identity provider system;
transmitting the signed certificate to the first user;
in response to commands from the first user, maintaining a set of trusted contacts for the user, wherein the set of trusted contacts includes other users of the identity provider system; and
in response to receiving, from the first user, a first trust certificate corresponding to a first web server:
selectively storing the first trust certificate in association with the unique identifier of the first user; and
in response to receiving, from one of the set of trusted contacts, a trust certificate request targeting the first web server, selectively transmitting the first trust certificate to the one of the set of trusted contacts.

11. The identity provider system of claim 10 wherein the instructions include transmitting, to the first user, a public key for each of the set of trusted contacts.

12. The identity provider system of claim 10 wherein the unique identifier includes at least one of (i) a username of the first user for use in the identity provider system, (ii) an email address of the first user, (iii) a real name of the first user, and (iv) a social media handle of the first user.

13. The identity provider system of claim 10 wherein:
the set of trusted contacts is a subset of contacts with whom the first user is associated in the identity provider system; and
the contacts with whom the first user is associated in the identity provider system include at least one of (i) one or more humans and (ii) one or more businesses.

14. The identity provider system of claim 10 wherein the instructions include, in response to receiving, from the first user, a trust certificate request targeting a second web server:
identifying a set of trust certificates, wherein each of the trust certificates in the set of trust certificates corresponds to the second web server and is associated with a contact in the set of trusted contacts;
in response to the set of trust certificates being non-empty, selectively transmitting at least one of the set of trust certificates to the first user; and
in response to the set of trust certificates being empty, transmitting an error to the first user, wherein the error indicates a lack of trust in the second web server.

15. The identity provider system of claim 10 wherein the instructions include, in response to receiving, from the one of the set of trusted contacts, the trust certificate request targeting the first web server:
attempting to verify a signature of the trust certificate request; and
transmitting the first trust certificate to the one of the set of trusted contacts only in response to successful verification of the signature.

16. The identity provider system of claim 10 wherein the instructions include, in response to receiving, from the first user, the first trust certificate:
attempting to verify a signature of the first trust certificate using the user public key; and
storing the first trust certificate in association with the unique identifier of the first user only in response to successful verification of the signature.

* * * * *